US012633654B1

(12) United States Patent
Miers et al.

(10) Patent No.: US 12,633,654 B1
(45) Date of Patent: May 19, 2026

(54) IN-FIELD CALIBRATION ANTENNA USING PARASITIC ELEMENTS OF A PHASED ARRAY ANTENNA

(71) Applicant: Amazon Technologies, Inc., Seattle, WA (US)

(72) Inventors: Zachary Thomas Miers, Duvall, WA (US); Kasra Ghaemi, Redmond, WA (US); Tara Yousefi, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 338 days.

(21) Appl. No.: 18/228,524

(22) Filed: Jul. 31, 2023

(51) Int. Cl.
| | |
|---|---|
| *H01Q 3/26* | (2006.01) |
| *H01Q 1/52* | (2006.01) |
| *H01Q 3/36* | (2006.01) |
| *H01Q 9/04* | (2006.01) |
| *H04B 7/185* | (2006.01) |

(52) U.S. Cl.
CPC ............. *H01Q 3/267* (2013.01); *H01Q 1/523* (2013.01); *H01Q 3/36* (2013.01); *H01Q 9/0414* (2013.01); *H04B 7/18513* (2013.01)

(58) Field of Classification Search
CPC .......... H01Q 3/267; H01Q 3/523; H01Q 3/36; H01Q 9/0414; H04B 7/18513
See application file for complete search history.

(56) References Cited

U.S. PATENT DOCUMENTS

| | | | | |
|---|---|---|---|---|
| 11,296,409 B1 * | 4/2022 | Yousefi | ................ | H01Q 9/0407 |
| 2023/0155649 A1 * | 5/2023 | Hajimiri | .............. | H01Q 3/2605 |
| | | | | 375/267 |

FOREIGN PATENT DOCUMENTS

JP          2019186717 A   * 10/2019

* cited by examiner

*Primary Examiner* — Seokjin Kim
(74) *Attorney, Agent, or Firm* — Kilpatrick Townsend & Stockton LLP

(57) ABSTRACT

Technologies directed to a customer terminal (CT) with an in-field calibration antenna using parasitic elements of a phased array antenna are described. Once deployed, the CT can establish a communication link with a satellite (SAT) in a satellite network. The CT can also calibrate the phased array antenna using the calibration antenna.

20 Claims, 17 Drawing Sheets

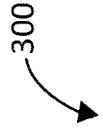
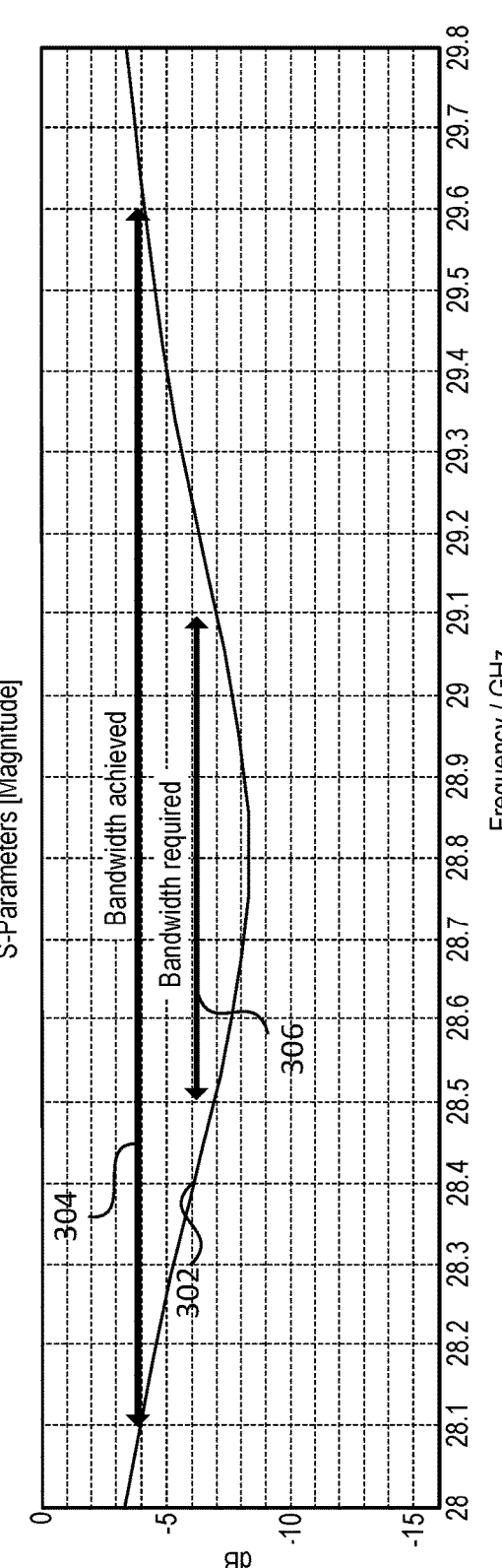
FIG. 3

400

0.38 mm 3.16 mm 0.77 mm

402

0.79 mm

404

1.03 mm 0.33 mm

406

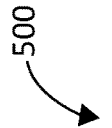
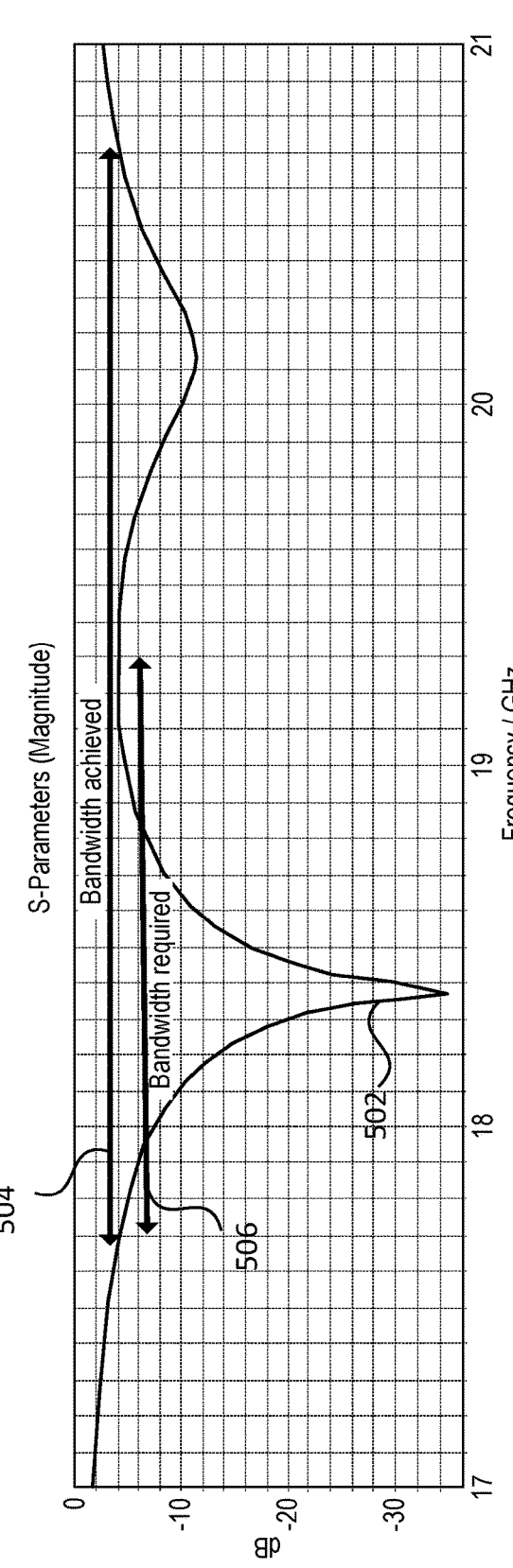
FIG. 5

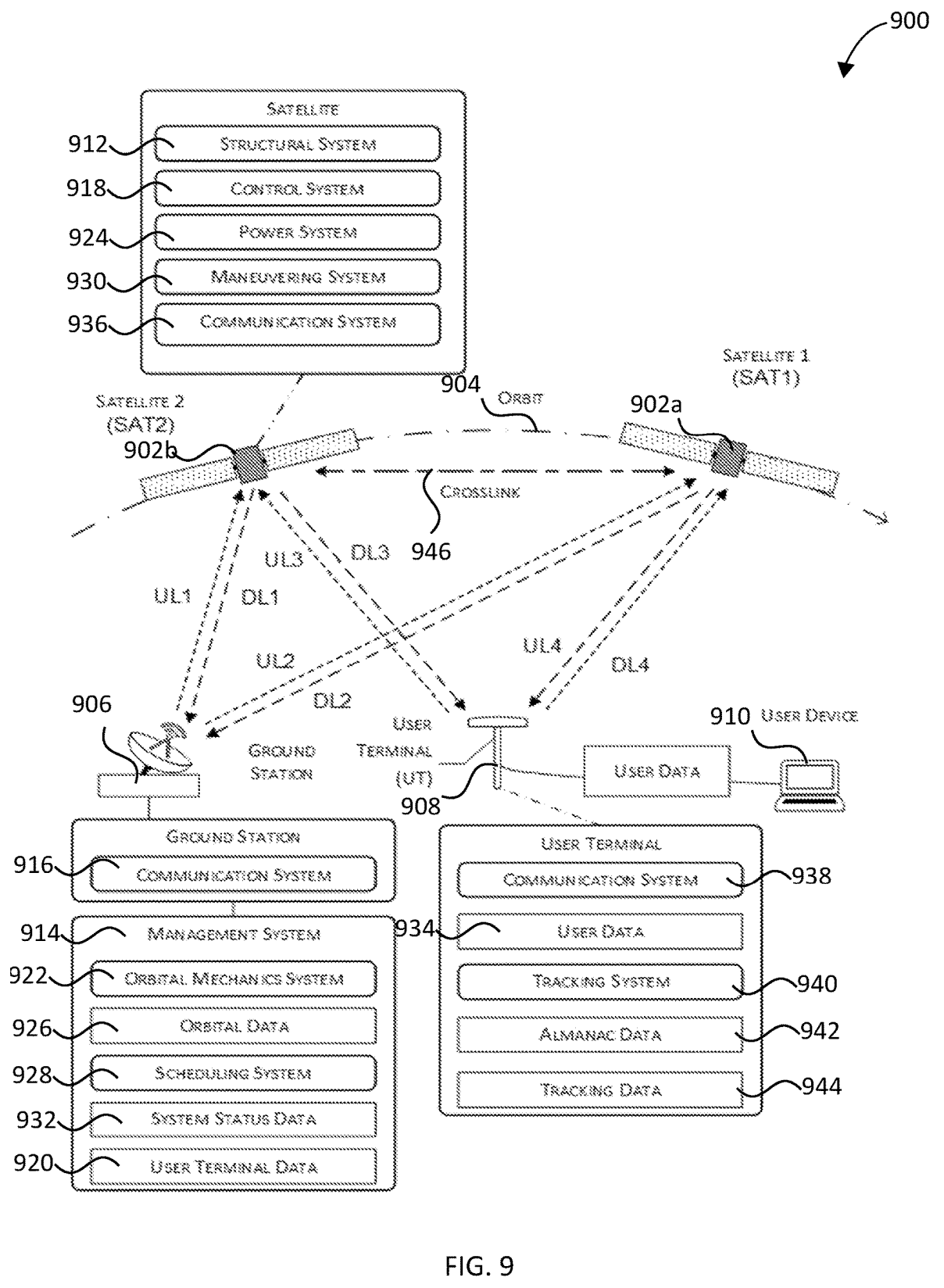

900

SATELLITE

912 — STRUCTURAL SYSTEM

918 — CONTROL SYSTEM

924 — POWER SYSTEM

930 — MANEUVERING SYSTEM

936 — COMMUNICATION SYSTEM

SATELLITE 2
(SAT2)
902b

904    ORBIT

SATELLITE 1
(SAT1)

902a

CROSSLINK

UL3    DL3    946

UL1    DL1

UL2

UL4    DL4

DL2

906

GROUND
STATION

USER
TERMINAL
(UT)

910  USER DEVICE

USER DATA

908

GROUND STATION

916 — COMMUNICATION SYSTEM

914 — MANAGEMENT SYSTEM

922 — ORBITAL MECHANICS SYSTEM

926 — ORBITAL DATA

928 — SCHEDULING SYSTEM

932 — SYSTEM STATUS DATA

920 — USER TERMINAL DATA

USER TERMINAL

934 — COMMUNICATION SYSTEM — 938

USER DATA

TRACKING SYSTEM — 940

ALMANAC DATA — 942

TRACKING DATA — 944

FIG. 9

IN-FIELD CALIBRATION ANTENNA USING PARASITIC ELEMENTS OF A PHASED ARRAY ANTENNA

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of digital media items. In order to communicate with other devices wirelessly, these electronic devices include one or more antennas.

Satellite-based broadband internet constellations are being developed to provide high-speed, low-latency broadband internet access to locations around the world using a network of low Earth orbit (LEO) satellites, ground stations, and user terminals (also called customer terminals (CTs)).

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 3 is a graph of a return loss of the TX calibration antenna of FIG. 2A according to at least one embodiment.

FIG. 5 is a graph of a return loss of the RX calibration antenna of FIG. 4A according to at least one embodiment.

FIG. 9 illustrates a portion of a communication system that includes two satellites of a constellation of satellites, each satellite being in orbit, according to embodiments of the present disclosure.

DETAILED DESCRIPTION

Figure 1:
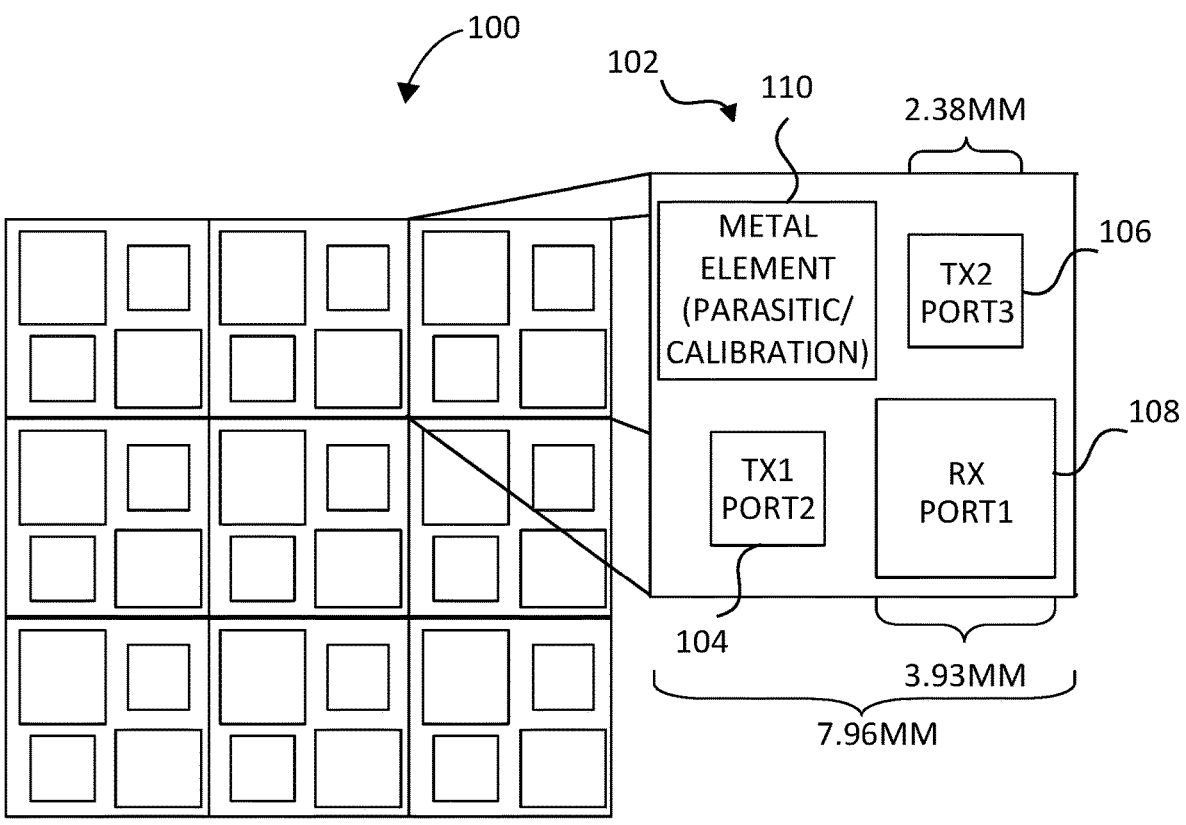
FIG. 1 illustrates a phased array antenna with a repeating pattern of unit cells according to at least one embodiment.

Technologies directed to a customer terminal (CT) with an in-field calibration antenna using parasitic elements of a phased array antenna are described. All phased array antennas need to be calibrated to have the same phase and amplitude or a specific phase and amplitude. Also, phased array antennas can have radiation in unwanted directions. Most phased array antenna designs have periodic patterns of elements, which results in high sidelobes and grating lobes. Sidelobe-level adjustments can be made with amplitude tapering, and grating lobe peaks can be reduced using subarrays of unequal sizes or randomization that breaks a periodicity of the phased array antenna. The peak grating lobes can be reduced by redistributing the energy into distributed sidelobe regions with lower peak levels but nearly the same average level. The peak amplitude of unwanted lobes can be reduced by adding additional rotations and/or randomizing element orientation, distributing the energy into other regions, and reducing side lobe amplitude. To address these problems, parasitic elements can be added to the CT phased array antennas, resulting in lower radiation in unwanted directions and lower grating lobes. There are always space limitations on a top layer of a phased array antenna, making it challenging to add additional antennas for in-field calibration of the phased array antenna. Since the parasitic elements are already taking up space, there will not be space left for additional antennas for in-field calibration in some phased array antenna designs.

Aspects and embodiments of the present disclosure overcome these deficiencies and others by providing a metal element that operates as a parasitic element at a first time and a calibration antenna at a second time. Aspects and embodiments of the present disclosure repurpose the parasitic element, which is used to reduce radiation in unwanted directions, to operate as a calibration antenna. In particular, parasitic elements can be used as part of the phased array antenna to reduce radiation in unwanted directions, and the in-field calibration antenna designs use the parasitic elements to calibrate the phased array antenna. Aspects and embodiments of the present disclosure can provide calibration without increasing the space needed for calibration antennas. In general, the in-field calibration can be used to correct the phase and amplitude of an active antenna. An active antenna is one that transmits electromagnetic energy or receives electromagnetic energy. In some embodiments, the in-field calibration antenna can be coupled to a feed point and fed an RF signal to radiate electromagnetic energy as a TX element. In this case, the TX element is coupled to a transmitter and can be used to calibrate the RX elements of the phased array antenna. In other embodiments, the in-field calibration antenna can be considered an RX calibration antenna since it is being used to calibrate the RX elements. Alternatively, it can be referred to as a TX calibration antenna since it is being used to transmit electromagnetic energy. The in-field calibration antenna can also be coupled to a feed point to receive electromagnetic energy as an RX element. In this case, the RX element is coupled to a receiver and can be used to calibrate the TX elements of the phased array antenna. The in-field antenna can be considered a TX calibration antenna since it is being used to calibrate the TX elements. Alternatively, it can be referred to as an RX calibration antenna since it is being used to receive electromagnetic energy.

FIG. 1 illustrates a phased array antenna 100 with a repeating pattern of unit cells according to at least one embodiment. A unit cell 102 of the repeating pattern of unit cells includes a first patch element 104, a second patch element 106, a third patch element 108, and a metal element 110. The first patch element 104, the second patch element 106, the third patch element 108, and the metal element 110 are located in a first layer of the phased array antenna 100. The first patch element 104 is coupled to a first feed point (not illustrated in FIG. 1). The second patch element 106 is coupled to a second feed point (not illustrated in FIG. 1). The third patch element 108 is coupled to a third feed point (not illustrated in FIG. 1). The metal element 110 can operate as a parasitic element in a first mode. The metal element 110 can be similar in shape and/or size to the first patch element 104 to break a periodicity of the repeating pattern of unit cells in the first mode. The metal element can operate as a calibration antenna in a second mode. In the second mode, the metal element 110 is selectively coupled to a fourth feed point (not illustrated in FIG. 1). It should be noted that "first mode" and "second mode" are operational modes of the device or circuitry, not antenna radiation modes of the phased array antenna 100.

The phased array antenna 100 can be part of a CT. The phased array antenna 100 can be part of other types of devices. Although not illustrated in FIG. 1, the phased array antenna 100 is coupled to beamforming circuitry. The beamforming circuitry is coupled to a processing device. The processing device can establish, using the phased array antenna 100 and the beamforming circuitry, a communication link with a satellite (SAT) in a first operational mode of the CT. In a second operational mode of the CT, the processing device can calibrate, using the calibration antenna, the phased array antenna 100.

In at least one embodiment, the metal element 110 can operate as a TX calibration antenna. The TX antenna can include multiple grounding points, as illustrated and described below with respect to FIG. 2A. The grounding points can be coupled to a ground potential in the second mode. In at least one embodiment, the first patch element 104 and the second patch element 106 are TX elements, and the third patch element 108 is an RX element. In at least one embodiment, the first patch element 104 and the second patch element 106 are RX elements, and the third patch element 108 is a TX element.

In at least one embodiment, the metal element 110 can operate as an RX calibration antenna. The RX antenna can include one or more tuning elements located in one or more layers of the phased array antenna 100 below the metal element 110, as illustrated and described below with respect to FIG. 4A to FIG. 6C. In at least one embodiment, the one or more tuning elements include a first tuning element located in a second layer of the array antenna below the first layer and a second tuning element located in a third layer of the array antenna below the first layer. The first tuning element can have a disk shape with a diameter that is less than a width of the metal element. The second tuning element can have a rectangular shape with a length less than the diameter. In at least one embodiment, the first patch element 104 and the second patch element 106 are TX elements, and the third patch element 108 is an RX element. In at least one embodiment, the first patch element 104 and the second patch element 106 are RX elements, and the third patch element 108 is a TX element.

As described herein, in-field calibration antenna designs use the parasitic elements (metal element 110), which are part of the design to reduce radiation in unwanted directions, as either TX calibration antennas and/or RX calibration antennas. In general, randomly tiled sub-arrays can effectively reduce the grating lobe as periodicity is disturbed. The metal elements 110 can break the periodicity of the phased array antenna 100. The phased array antenna 100 can also be divided into contiguous subarrays of random sizes. The peak amplitude of unwanted lobes can be reduced by adding additional rotation of feeds or elements of the phased array antenna 100 and distributing the energy into other regions. Using the metal elements 110 as parasitic elements can result in lower radiation in unwanted directions and lower grating lobes. Since there are always space limitations in the area on the top layer of the phased array antenna 100 and since the phased array antenna 100 already has the metal elements as parasitic elements, these metal elements can be repurposed for calibration antennas. As such, no additional area is needed for calibration antennas where space is already limited for the phased array antenna 100. The dual purpose of the metal elements 110 can solve two problems of radiation in unwanted directions and space limitations.

In at least one embodiment, the phased array antenna 100 can be used in a CT as a CT array. The phased array antenna 100 illustrated in FIG. 1 can represent a portion of a larger CT array. As mentioned above, one of the purposes of the parasitic elements is to break the periodicity and to reduce radiation in unwanted directions. As described in more detail below, different designs of in-field calibration antennas use these parasitic elements. It should be noted that the dimensions of the phased array antenna 100 are exemplary dimensions for operating in the frequency ranges of 28.5 GHz to 29.1 GHZ and 17.7 GHZ to 19.3 GHZ. In other embodiments, the dimensions may vary for phased array antennas that operate in other frequency ranges, such as the Ku band (e.g., 12 GHz to 18 GHZ).

In-Field Calibration for Customer Terminal Phased Array Antenna

Phased array antennas need a mechanism to do in-field calibration. For that, they need calibration antennas. Described herein are different methods to place calibration antennas into the parasitic elements of the phased array antenna. This is very important and challenging for CT phased arrays as they are very dense. There are two main differences between dense CT and payload phased array antennas that do not allow the use of the same ideas of adding multiple calibration antennas to the array because there is no space in the top layer of a dense CT array for slot antennas or any other type of antennas. For the CT array, initial factory calibration is done, which gives an idea of the system's performance. However, the beamformer integrated circuits (ICs) (also referred to as digital beamformers (DBFs)) need to be considered, as they generally have a large variation with temperature. This means that a phase lock would not necessarily result in phase coherence. The in-field calibration of the customer terminal is very important because the beamformer ICs connected to the phased array antenna can have random changes in both phase and amplitude. The amplitude and phase are functions of process variation and mismatches within the beamformer ICs. These variations and mismatches can cause the performances of the beamformer ICs related to temperature to be different from beamformer IC to beamformer IC. For example, a customer terminal used in Arizona could perform differently than one used in Maine, both at the array level and from DBF to DBF. An in-factory calibration can be done to calibrate and compensate for the initial differences in beam former performance. However, different beamformer ICs can be affected differently in terms of the environment. Also, there are usually multiples of these IC in a chain which means that the variation will be even more. The path from each antenna element to the beamformer IC can see variations that need calibration. Even though the variations can be dealt with during in-factory calibration, each path can change differently due to temperature, humidity, and aging, which cannot be compensated with in-factory calibration. Therefore, not only will each antenna see an initial random variation mentioned before, but also, when the customer terminal has been delivered to customers in different locations, each DBF could respond differently to temperature, humidity, and aging. This makes in-field calibration important to the performance of the customer terminal array. Temperature change, humidity, and aging are important in DBF to DBF difference and total array performance. Some of these effects can only be compensated with in-field calibration. A one-time calibration in the factory will be performed. However, when the CTs are delivered to customers in different temperature and humidity environments and after months of use and aging, the in-field calibration can ensure good performance. In-field calibration needs calibration antennas to obtain at least a 4 dB return loss since near-field propagation does not need a good match.

Parasitic Elements of Phased Array Antenna as Calibration Antennas

An array antenna can include a repeating pattern of elements with one or more transmit (TX) or receive (RX) elements located in a first layer of the array antenna. The metal elements 110, located in the first layer, can operate as parasitic elements to break a periodicity of the array antenna in a first mode. The same metal elements 110 can operate, in a second mode, as either a TX calibration antenna or an RX calibration antenna. In at least one embodiment, the TX or RX elements can include a first patch element, a second patch element, and a third patch element, each located in the first layer. The first patch element, the second patch element, and the third patch element can be part of a unit cell that forms the array antenna. The array antenna can be coupled to beamforming circuitry, including one or more transmitters and/or receivers. The TX or RX calibration antennas can be coupled to the same beamforming circuitry, or a separate transmitter or receiver used for calibrating the beamforming circuitry. The beamforming circuitry can be coupled to a processing device. The processing device can establish, using the array antenna and the beamforming circuitry, a communication link with a satellite (SAT) in the first mode, and calibrate, using the calibration antenna, the array antenna in the second mode.

In at least one embodiment, the first patch element is coupled to a first feed point of a first transmitter, and the first patch element is a TX element. The second patch element is coupled to a second feed point of a second transmitter, and the second patch element is a TX element. The third patch element is coupled to a third feed point of a first receiver, and the third patch element is an RX element. The metal element 110, in the second mode, is selectively coupled to a fourth feed point of a third transmitter or a second receiver. When coupled to the third transmitter, the metal element 110 is a TX calibration antenna. When coupled to the second receiver, the metal element 110 is an RX calibration antenna. In at least one embodiment, the metal element 110 is similar in shape and size to the third patch element. Alternatively, the metal element 110 can be similar in shape and size as one or both of the first patch element or the second patch element.

Figure 2A:
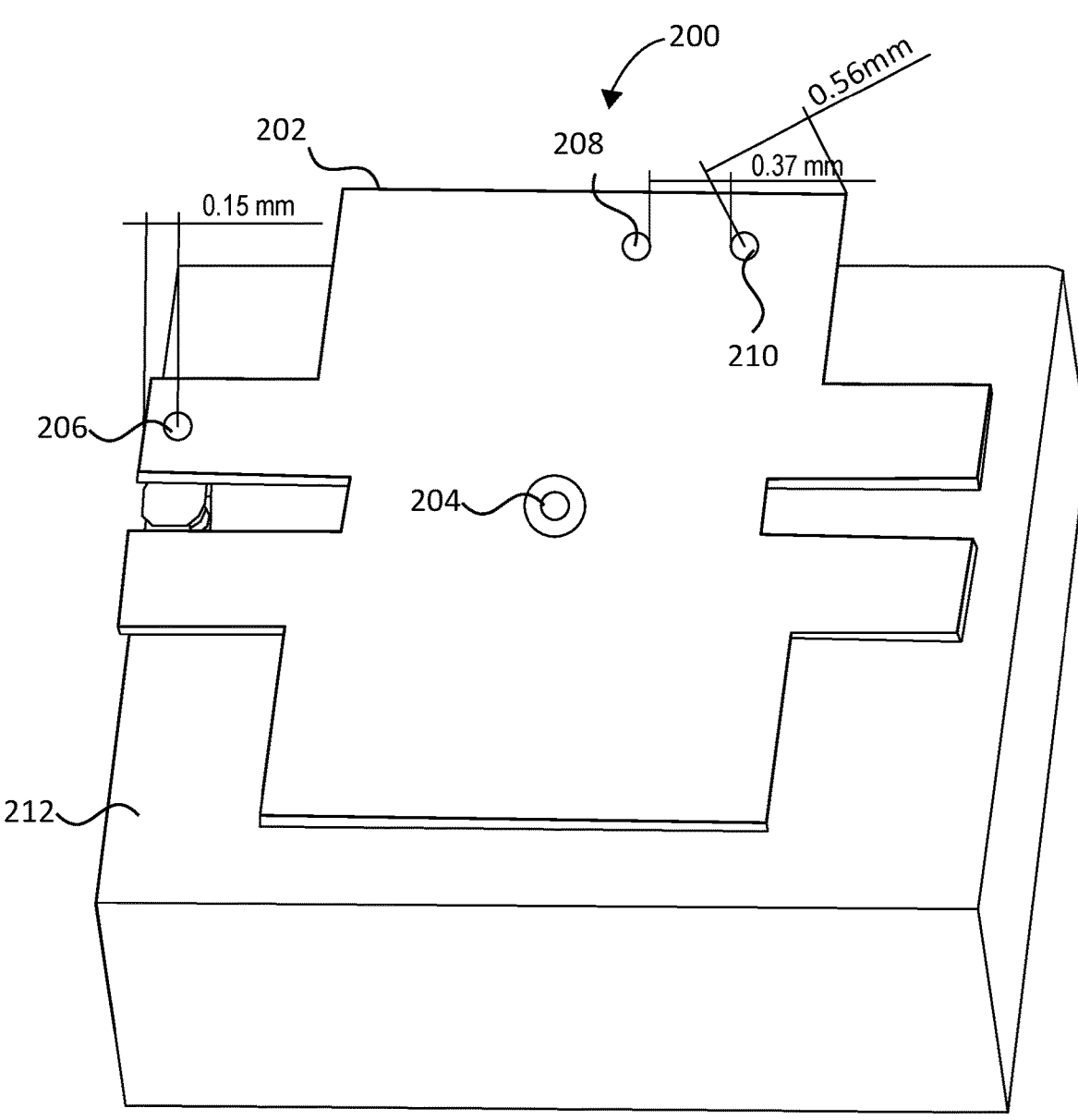
FIG. 2A is a perspective view of a top layer of a metal element that operates as a transmit (TX) calibration antenna with multiple grounding points according to at least one embodiment.
Figure 4A:
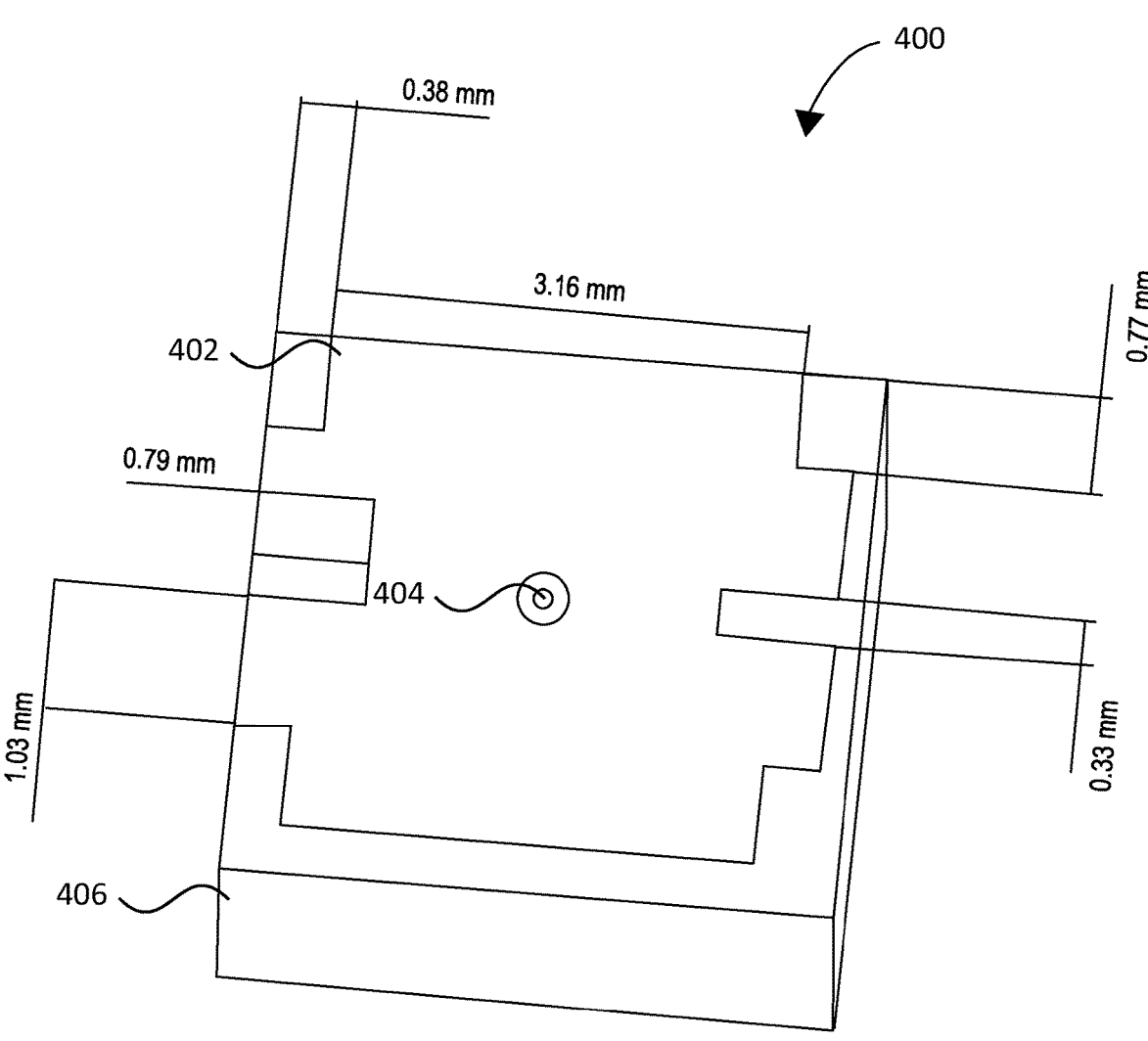
FIG. 4A is a perspective view of a top layer of a metal element that operates as a receive (RX) calibration antenna according to at least one embodiment.
Figure 6A:
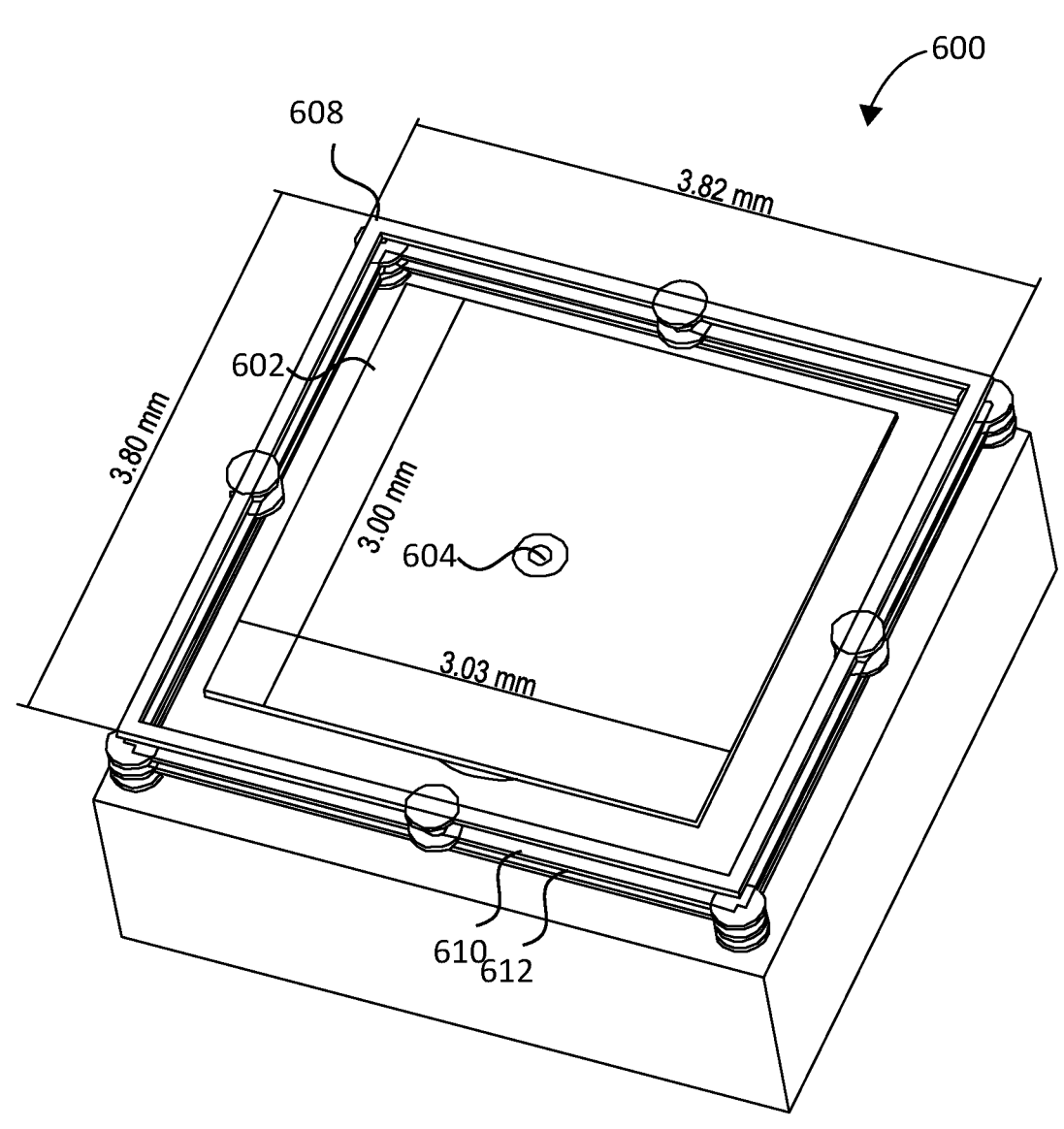
FIG. 6A is a perspective view of a top layer of a metal element that operates as an RX calibration antenna according to at least one embodiment.

FIG. 2A and FIG. 4A illustrate parasitic elements for in-field calibration antennas that use existing geometries of parasitic elements of a phased array antenna since a limited number of these metal elements would be needed for TX or RX calibration antennas. FIG. 6A illustrates parasitic elements for in-field calibration antennas where a new design can benefit the array performance since it could randomize the phased array antenna even more, further reducing radiation in unwanted directions. This will be true as long as the locations of these parasitic elements are random.

As discussed above, since there is no space within the phased array antenna to add calibration antennas around the periphery or within the array of elements, the goal is to use and possibly modify the parasitic elements and design calibration antennas for TX and RX. These antennas serve two purposes. They reduce radiation in unwanted directions since they break periodicity and serve as calibration antennas. In one case, the TX calibration antenna needs a smaller bandwidth (e.g., 28.5 GHz to 29.1 GHZ), but the RX calibration antenna needs a very large bandwidth (e.g., 17.7 GHz to 19.3 GHZ), which make, making very challenging. The design of the TX calibration antenna (see FIG. 2A) has been done without changes to the parasitic element geometry, and two different RX calibration antennas (see FIG. 4A and FIG. 6A) have been designed. One has a minor change to the metal element's shape and geometries, and the other differs from the metal element's shape and geometries.

FIG. 2A is a perspective view of a top layer of a metal element 202 that operates as a TX calibration antenna 200 with multiple grounding points according to at least one embodiment. The TX calibration antenna 200 includes the metal element 202 in a top layer above a ground plane 212. The metal element 202 can radiate electromagnetic energy by driving an RF signal at a feed point 204. The metal element 202 can be located in the top layer of a circuit board of a phased array antenna. Beamforming circuitry can be coupled to the feed point 204 to provide the RF signal with a specific amplitude and phase. The metal element 202, which operates as a parasitic element in a first mode, can include multiple grounding points at specified locations to allow the metal element 202 to operate as a TX calibration antenna in a second mode. In at least one embodiment, the metal element 202 is a patch element disposed in the top layer above the ground plane 212. In at least one embodiment, the metal element 202 is similar in shape and size to a patch element of an array antenna, such as a TX element or an RX element of the array antenna.

In particular, a first grounding point 206 can be located at a first edge of the metal element 202, while a second grounding point 208 and a third grounding point 210 can be located at a second edge adjacent to the first edge. The spacing from the edges and the spacing between the grounding points can be used to tune the TX frequencies of the metal element 202. In at least one embodiment, the grounding point 206 is located approximately 0.15 mm from the first edge. In at least one embodiment, the grounding point 208 and grounding point 210 are located approximately 0.37 mm apart. In at least one embodiment, the grounding point 210 is located approximately 0.56 from a corner between the second edge and a third edge of the metal element 202. Alternatively, other numbers of grounding points and locations can be used to tune the metal element 202.

In at least one embodiment, the grounding point 206, grounding point 208, and grounding point 210 can cause the metal element 202 to radiate at a bandwidth of interest without changing the geometry of the parasitic element. The grounding points 206-208 can be grounding pins. The grounding points 206-208 can mimic folding the antenna and guide currents so that the TX calibration antenna 200 can radiate in the desired TX frequencies, such as in a TX frequency range of 17.66 GHz to 20.73 GHZ. As shown in the graph 300 of FIG. 3, the TX calibration antenna 200 can radiate in the TX frequency range of 17.66 GHz to 20.73 GHz with at least-4 dB return loss. It should be noted that the dimensions and placements of the grounding points may vary for phased array antennas that operate in other frequency ranges, such as the Ku band.

Figure 2B:
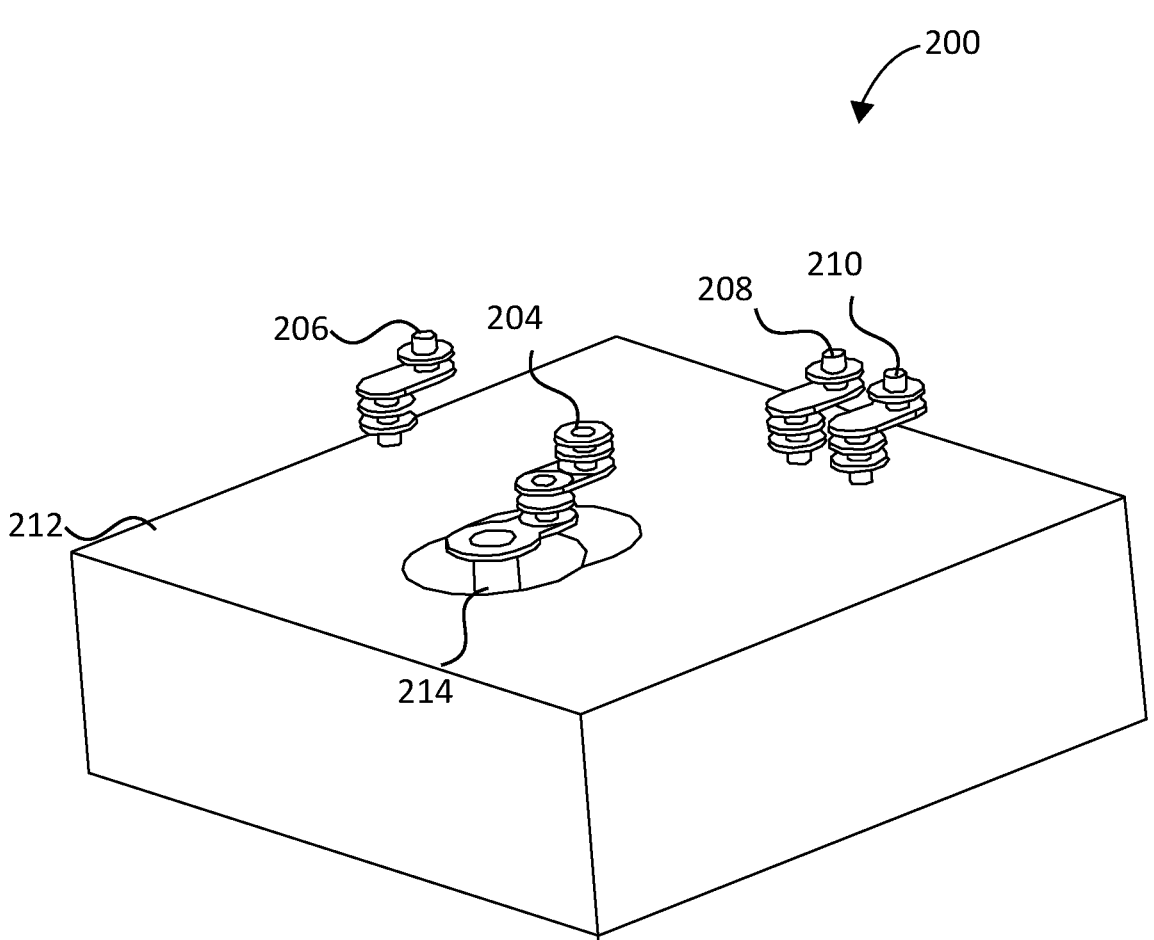
FIG. 2B is a perspective view of lower layers of the TX calibration antenna of FIG. 2A according to at least one embodiment.

FIG. 2B is a perspective view of lower layers of the TX calibration antenna 200 of FIG. 2A according to at least one embodiment. As illustrated in FIG. 2B, the grounding point 206 can be coupled to the ground plane 212 via one or more vias and one or more conductive traces in the lower layers of the TX calibration antenna 200. Similarly, the feed point 204 can be coupled to the beamforming circuitry using one or more vias and one or more conductive traces in the lower layers of the TX calibration antenna 200. As illustrated, the feed point 204 can couple to the beamforming circuitry using a via 214 that goes through the ground plane 212. In some embodiments, the conductive traces on the lower layers can operate as impedance-matching elements between the feed point 204 and the beamforming circuitry. It should be noted that the TX calibration antenna 200 can be sequentially rotated within the array to achieve the desired array performance. In some cases, the elements of the array can be randomly rotated to break the periodicity of the array.

FIG. 3 is a graph 300 of a return loss 302 of the TX calibration antenna 200 of FIG. 2A according to at least one embodiment. Return loss is a measure of the amount of power reflected back to the source due to an impedance mismatch between the source and the load. Return loss is typically expressed as a negative number in decibels (dB). The negative sign indicates that return loss is a loss parameter, meaning it represents the amount of power lost or reflected back to the source. The higher the return loss (a larger negative number), the lower the amount of power being reflected, indicating a better match between the source and the load. Return loss can be calculated using S-parameters. Specifically, the return loss at a particular port can be determined from the magnitude of the corresponding S-parameter. For example, the return loss at port 1 (RL1) can be calculated as RL1=−20*log 10 ($|S_{11}|$), where $S_{11}$ is the reflection coefficient at port 1.

As illustrated in the graph 300, a bandwidth 304 achieved by the TX calibration antenna 200 is shown to be from 28.1 GHz to 29.6 GHz with 4 dB return loss. The CT bandwidth 306 required can be a 7 dB return loss. This means that a much larger bandwidth has been achieved with TX calibration antenna 200. In at least one embodiment, the TX calibration antenna 200 can achieve a percentage bandwidth of approximately 5% with at least 4 dB return loss.

As described above, the metal elements 110 of FIG. 1 can be configured as TX calibration antennas as illustrated in FIG. 2A. In other embodiments, the metal elements 110 of FIG. 1 can be configured as RX calibration antennas. As described above, there are two variations of the RX calibration antenna in FIG. 4A and FIG. 6A.

Figure 4B:
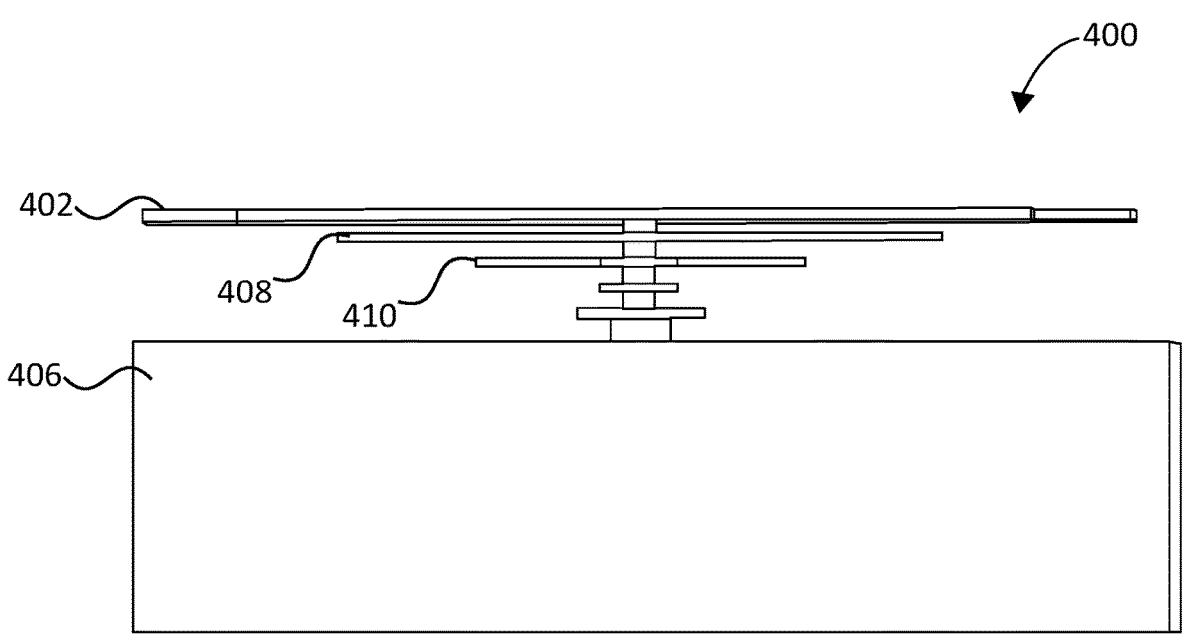
FIG. 4B is a side view of the RX calibration antenna 400 of FIG. 4A with tuning elements located in lower layers below the metal element according to at least one embodiment.
Figure 4C:
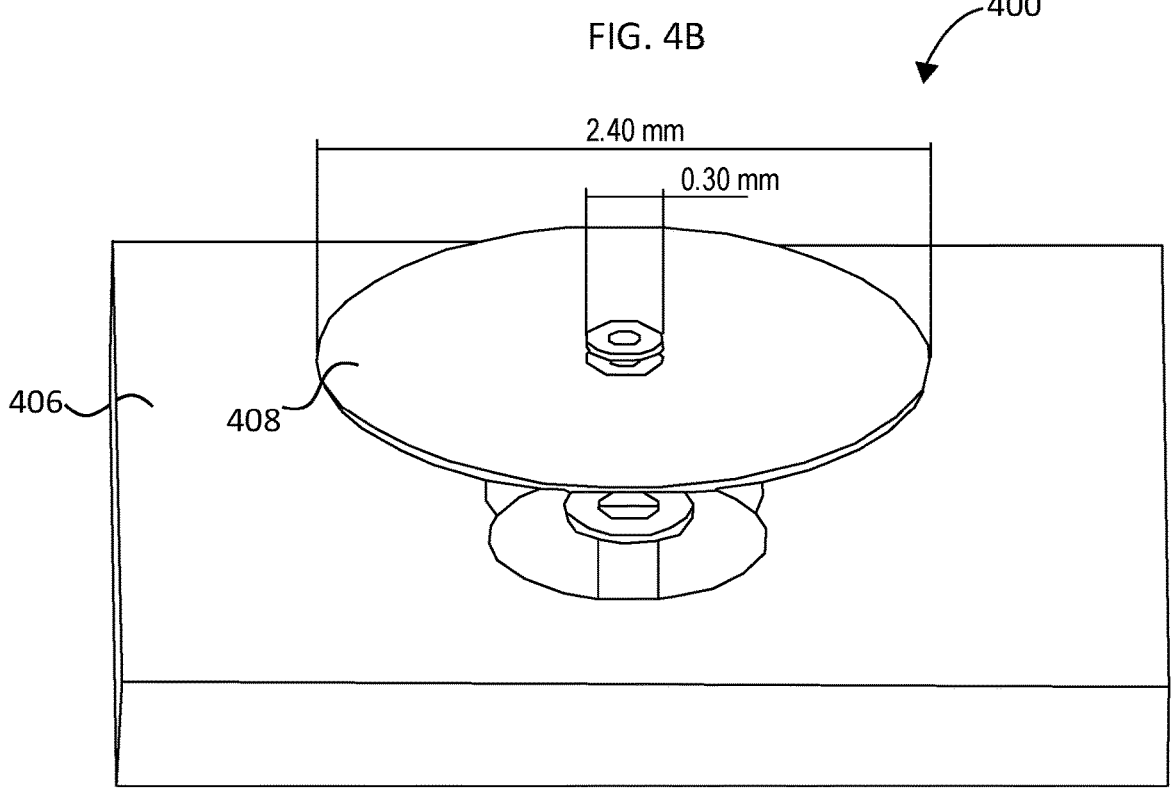
FIG. 4C is a perspective view of a second layer of the RX calibration antenna of FIG. 4A according to at least one embodiment.
Figure 4D:
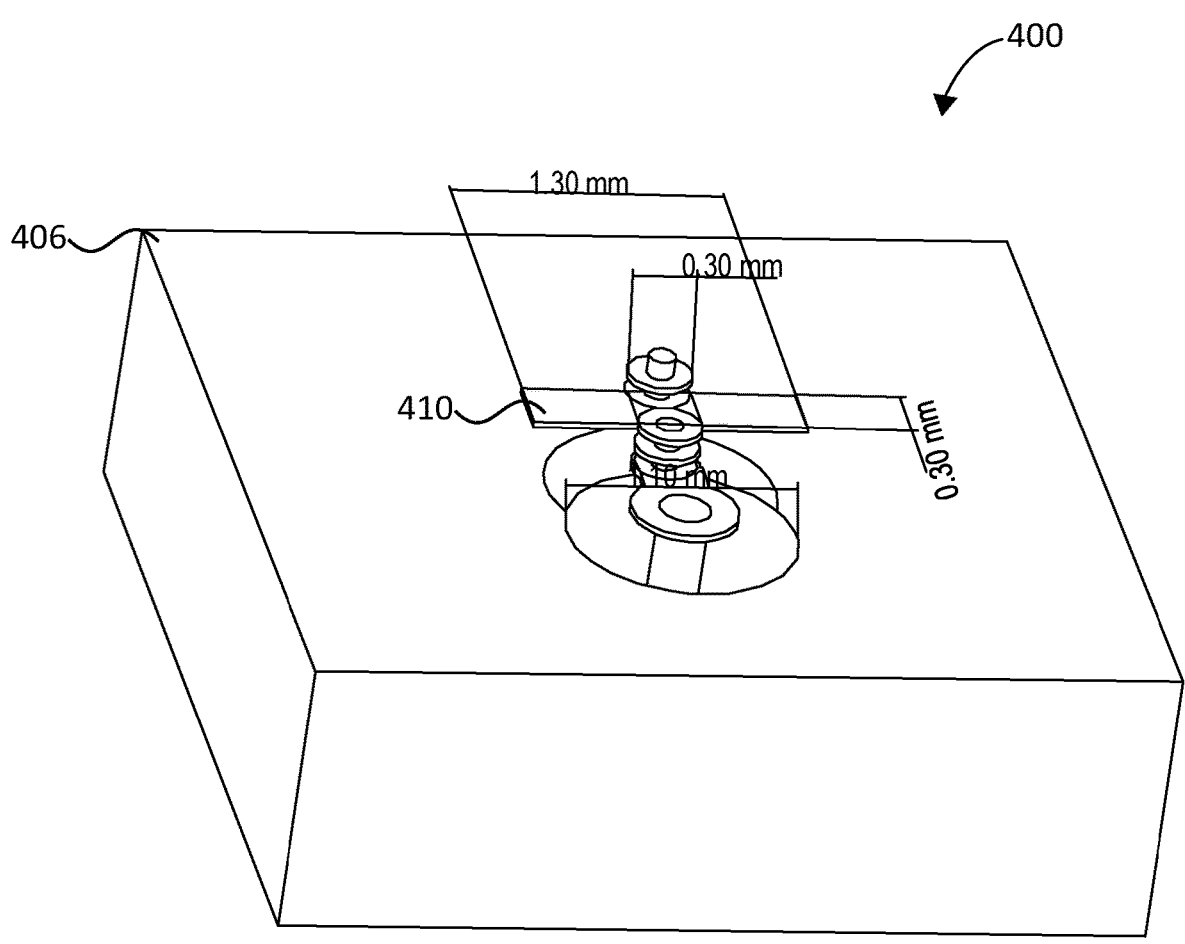
FIG. 4D is a perspective view of a fourth layer of the RX calibration antenna of FIG. 4A according to at least one embodiment.

FIG. 4A is a perspective view of a top layer of a metal element 402 that operates as an RX calibration antenna 400 according to at least one embodiment. As described above, the challenge of the calibration antenna is that it cannot take more space than allocated because that would result in a change in the CT elements. The first variation, as shown with the metal element 402 in FIG. 4A, is done by trying to stay as close as possible to the initial geometry of the parasitic elements and using lower layers to increase the bandwidth. The lower layers are shown in FIG. 4B to FIG. 4D. The lower layers can include one or more tuning elements to increase the bandwidth of the RX calibration antenna 400. The elements in the lower layers can tune the RX calibration antenna 400 to increase a bandwith, such as by a percentage bandwidth. and resonances have been obtained and bringing them as close as possible to each other has resulted in a large bandwidth. In this design, the bandwidth achieved is from 17.66 GHz to 20.73 GHz with 4 dB return loss.

As illustrated in FIG. 4A, the metal element 402 includes a feed point 404 that is coupled to a receiver (not illustrated in FIG. 4A). The metal element 402 can be a patch element disposed above a ground plane 406. The metal element 402 can include one or more cutouts to tune the metal element 402 to radiate at specific frequencies. As illustrated, the metal element 402 includes opposite cutouts at a middle section of the metal element 402. The metal element 402 also include cutouts at each of the four corners of the metal element 402. The specific dimensions and placements of these cutouts can vary for different frequency ranges.

The metal element 402 can receive electromagnetic energy and generate an RF signal at a feed point 404. The metal element 402 can be located in the top layer of a circuit board of a phased array antenna. Beamforming circuitry can be coupled to the feed point 404, the metal element 402 providing the RF signal with a specific amplitude and phase. The metal element 402, which operates as a parasitic element in a first mode, can include tuning elements located in lower layers under the metal element 402 to allow the metal element 402 to operate as an RX calibration antenna in a second mode. The tuning elements are illustrated and described below with respect to FIG. 4B to FIG. 4D. The metal element 402 can be used as a parasitic element to break a periodicity of the array antenna in the first mode. In at least one embodiment, the metal element 402 is a patch element disposed in the top layer above the ground plane 406. In at least one embodiment, the metal element 402 is similar in shape and size to a patch element of an array antenna, such as a TX element or an RX element of the array antenna.

FIG. 4B is a side view of the RX calibration antenna 400 of FIG. 4A with tuning elements located in lower layers below the metal element according to at least one embodiment. As illustrated in FIG. 4B, the RX calibration antenna 400 includes a first tuning element 408 located in a second layer of the array antenna below the first layer. The RX calibration antenna 400 also includes a second tuning element 410 located in a third layer of the array antenna below the second layer. In at least one embodiment, the first tuning element 408 has a disk shape, such as illustrated in FIG. 4C. In at least one embodiment, the second tuning element 410 has a rectangular shape, such as illustrated in FIG. 4D. Alternatively, other shapes of tuning elements can be used in the lower layers.

FIG. 4C is a perspective view of a second layer of the RX calibration antenna 400 of FIG. 4A according to at least one embodiment. As described above, the first tuning element 408 is located in a second layer of the array antenna below the first layer. The first tuning element 408 has a disk shape with a diameter less than a width of the metal element 402. In at least one embodiment, the diameter of the first tuning element 408 is approximately 2.40 millimeters (mm). Alternatively, other shapes and dimensions can be used for the first tuning element 408.

FIG. 4D is a perspective view of a fourth layer of the RX calibration antenna 400 of FIG. 4A according to at least one embodiment. As described above, the second tuning element 410 is located in a third layer of the array antenna below the first layer. The second tuning element 410 has a rectangular shape with a length less than the diameter. In at least one embodiment, the length of the second tuning element 410 is approximately 1.30 mm. Alternatively, other shapes and dimensions can be used for the second tuning element 410.

As described herein, the tuning elements can be used to increase the bandwidth of the RX calibration antenna 400 in the desired RX frequencies, such as an RX frequency range of 17.66 GHz to 20.73 GHz. As shown in the graph 500 of FIG. 5, the RX calibration antenna 400 can operate in the RX frequency range of 17.66 GHz to 20.73 GHz with 4 dB return loss. It should be noted that the RX calibration antenna 400 can be sequentially rotated within the array to achieve the desired array performance. In some cases, the elements of the array can be randomly rotated to break the periodicity of the array.

FIG. 5 is a graph 500 of a return loss 502 of the RX calibration antenna 400 of FIG. 4A according to at least one embodiment. As illustrated in the graph 500, a bandwidth 504 achieved by the RX calibration antenna 400 is shown to be from 17.66 GHz to 20.73 GHz with 4 dB return loss. The CT bandwidth 506 required can be a 7 dB return loss. This means that a much larger bandwidth has been achieved with RX calibration antenna 400. In at least one embodiment, the RX calibration antenna 400 can achieve a percentage bandwidth of approximately 5% with at least 4 dB return loss.

It should be noted that the RX calibration antenna 400 passes the specifications for the RX calibration antenna for the phased array. However, as described above, the metal element that is used for the parasitic element and calibration antenna can have different geometries that an already existing parasitic element design. In at least one embodiment, the design of the RX calibration antenna can have rings to increase the RX bandwidth, such as illustrated and described below with respect to FIG. 6A. The rings around the metal element can be used for isolation as well as to increase the bandwidth. The new design can have a better return loss. with a better return loss.

Figure 6B:
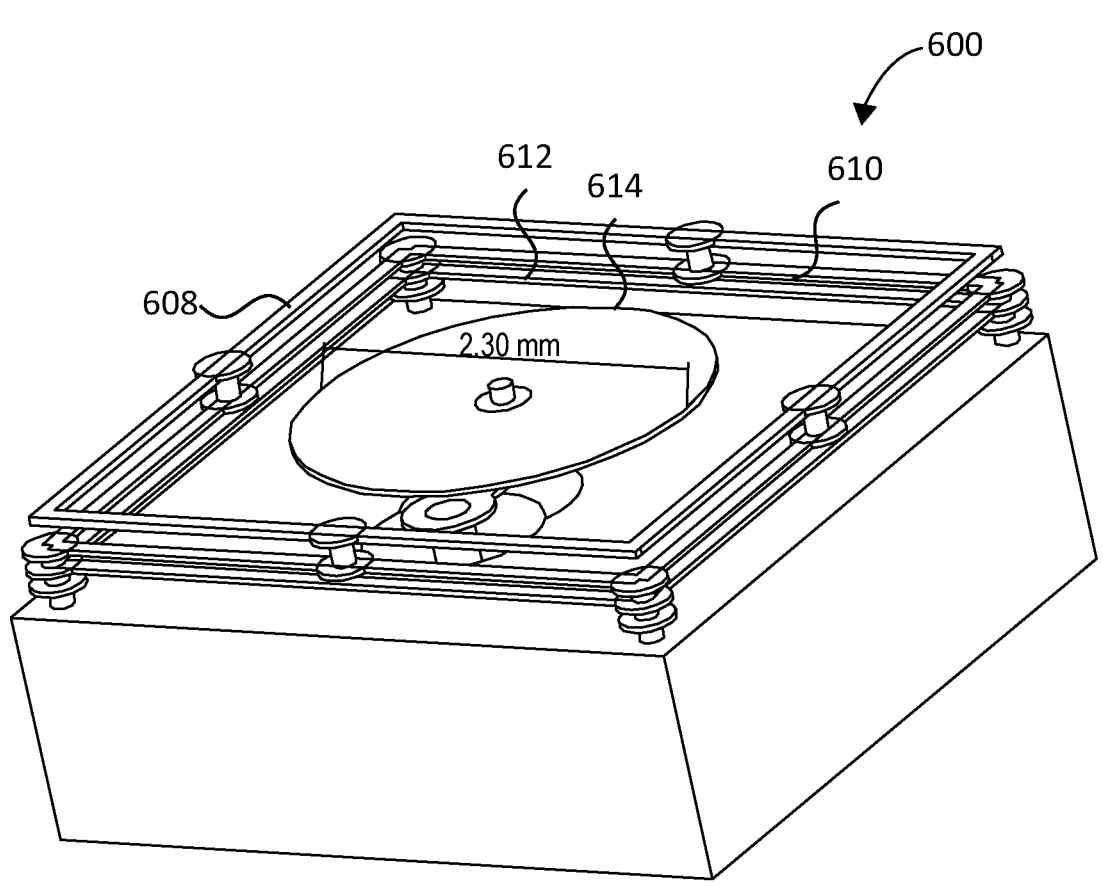
FIG. 6B is a perspective view of a second layer of the RX calibration antenna of FIG. 6A according to at least one embodiment.
Figure 6C:
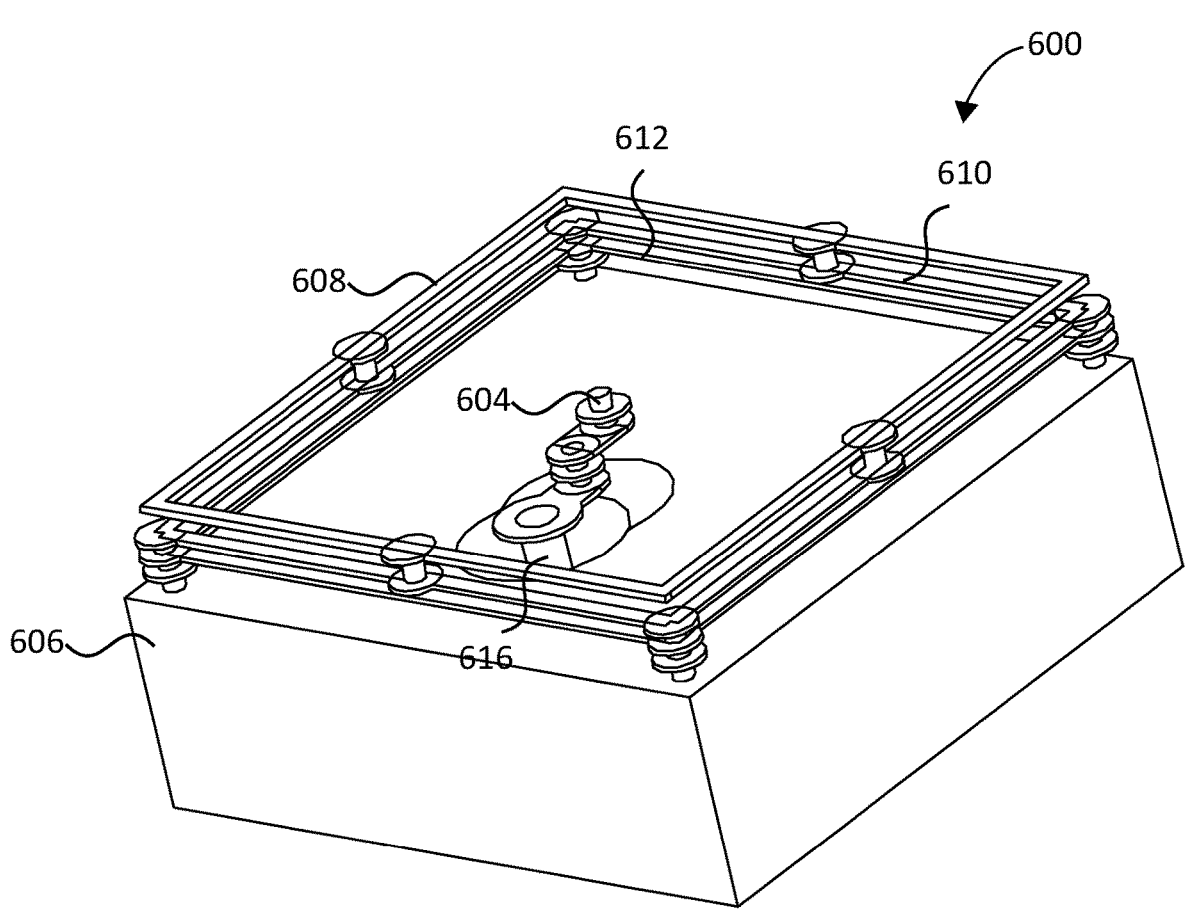
FIG. 6C is a perspective view of lower layers of the RX calibration antenna of FIG. 6A according to at least one embodiment.

FIG. 6A is a perspective view of a top layer of a metal element 602 that operates as an RX calibration antenna 600 according to at least one embodiment. The metal element 602 is a second variation with different geometries for the parasitic element. The RX calibration antenna 600 can use rings and the metal element 602 to increase the RX bandwidth. The ring(s) around the metal element 602 can provide isolation and increase the bandwidth. The RX calibration antenna 600 can also include one or more tuning elements in lower layers to increase the bandwidth of the RX calibration antenna 600. The lower layers are shown in FIG. 6B and FIG. 6C. The top layer couples to the lower layers, bringing resonances of the top layer and the lower layer as close as possible to increase a larger bandwidth. In this design, the bandwidth achieved is from 17.66 GHz to 20.73 GHz with 4 dB return loss.

As illustrated in FIG. 6A, the metal element 602 includes a feed point 604 that is coupled to a receiver (not illustrated in FIG. 6A). The metal element 602 can be a patch element disposed above a ground plane 606. The metal element 602 can include one or more cutouts to tune the metal element 602 to radiate at specific frequencies. As illustrated, the metal element 602 includes opposite cutouts at a middle section of the metal element 602. The metal element 602 also include cutouts at each of the four corners of the metal element 602. The specific dimensions and placements of these cutouts can vary for different frequency ranges.

The metal element 602 can receive electromagnetic energy and generate an RF signal at a feed point 604. The metal element 602 can be located in the top layer of a circuit board of a phased array antenna. Beamforming circuitry can be coupled to the feed point 604, the metal element 602 providing the RF signal with a specific amplitude and phase. The metal element 602, which operates as a parasitic element in a first mode, can include tuning elements located in lower layers under the metal element 402 to allow the metal element 602 to operate as an RX calibration antenna in a second mode. The tuning elements are illustrated and described below with respect to FIG. 6B to FIG. 6C. The metal element 602 can be used as a parasitic element to break a periodicity of the array antenna in the first mode. In at least one embodiment, the metal element 602 is a patch element disposed in the top layer above the ground plane 606. In at least one embodiment, the metal element 602 is similar in shape and size to a patch element of an array antenna, such as a TX element or an RX element of the array antenna.

As illustrated in FIG. 6A, the RX calibration antenna 600 includes a first ring 608, a second ring 610, and a third ring 612. The first ring 608 is located in the first layer. The first ring 608 surrounds the metal element 602. The second ring 610 is located in a second layer of the array antenna below the first layer. The third ring 612 is located in a third layer of the array antenna below the second layer. The second ring 610 and the third ring 612 are coupled to a set of grounding points. The first ring 608 and the second ring 610 are coupled together at points in between the set of grounding points. The grounding points can be at corners of the RX calibration antenna 600. The RX calibration antenna 600 can be a tuning element located in the second layer, such as illustrated in FIG. 6B. The tuning element can have a disk shape with a diameter that is less than a width of the metal element 602.

FIG. 6B is a perspective view of a second layer of the RX calibration antenna 600 of FIG. 6A according to at least one embodiment. As described above, the tuning element 614 is located in a second layer of the array antenna below the first layer. The tuning element 614 has a disk shape with a diameter that is less than a width of the metal element 602. In at least one embodiment, the diameter of the tuning element 614 is approximately 2.30 mm. Alternatively, other shapes and dimensions can be used for the tuning element 614.

FIG. 6C is a perspective view of lower layers of the RX calibration antenna 600 of FIG. 6A according to at least one embodiment. The feed point 604 can be coupled to the beamforming circuitry via one or more vias and one or more conductive traces in the lower layers of the RX calibration antenna 600. As illustrated, the feed point 604 can couple to the beamforming circuitry using a via 616 that goes through the ground plane 606. In some embodiments, the conductive traces on the lower layers can operate as impedance-matching elements between the feed point 604 and the beamforming circuitry.

Figure 7:
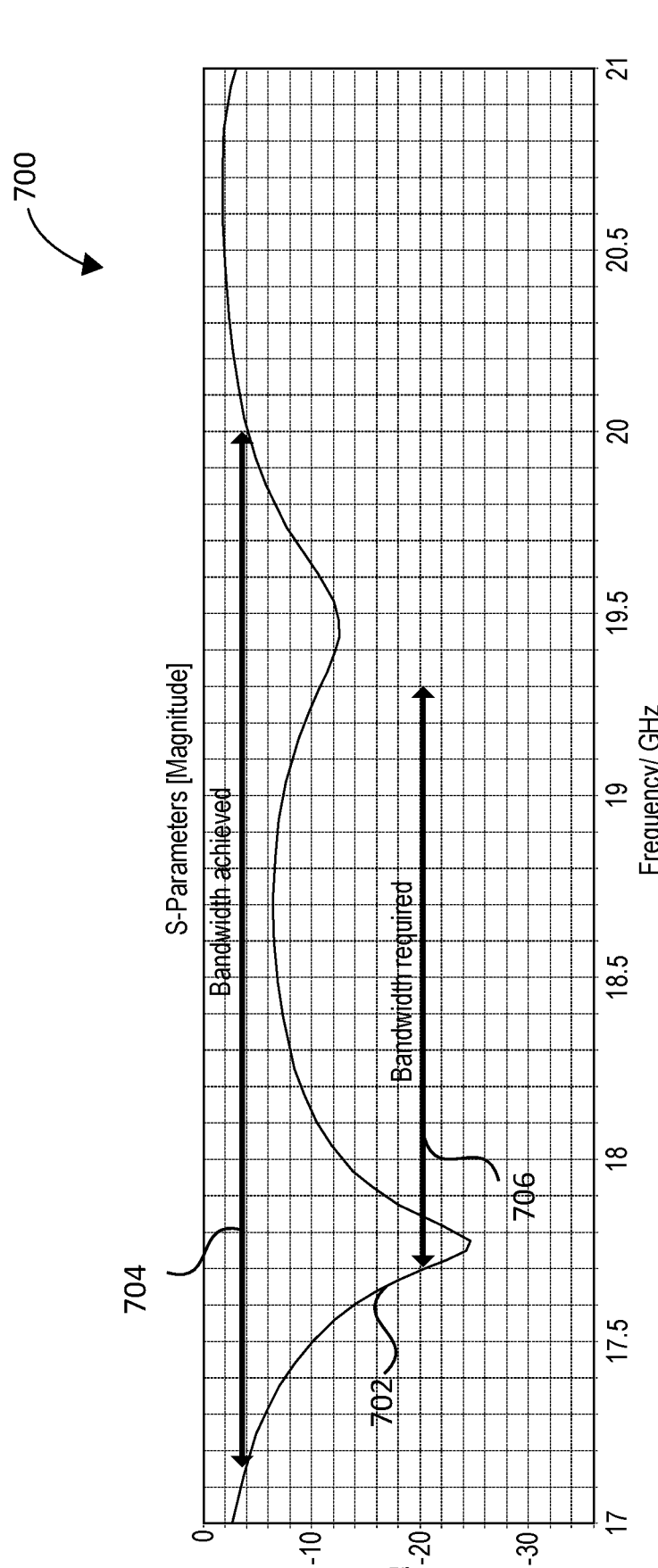
FIG. 7 is a graph of a return loss of the RX calibration antenna of FIG. 6A according to at least one embodiment.

FIG. 7 is a graph 700 of a return loss 702 of the RX calibration antenna 600 of FIG. 6A according to at least one embodiment. As illustrated in the graph 700, a bandwidth 704 achieved by the RX calibration antenna 600 is shown to be from 17.16 GHz to 20 GHz with 4 dB return loss and a lower return loss of about 6.5 dB is achieved in the RX band, which means that a much larger bandwidth has been achieved. The CT bandwidth 706 required can be a 7 dB return loss. The rings around the metal element can be used for isolation, as well as to increase the bandwidth. The new design can have a better return loss. In at least one embodiment, the RX calibration antenna 600 can achieve a percentage bandwidth of approximately 5% with at least 4 dB return loss.

Figure 8:
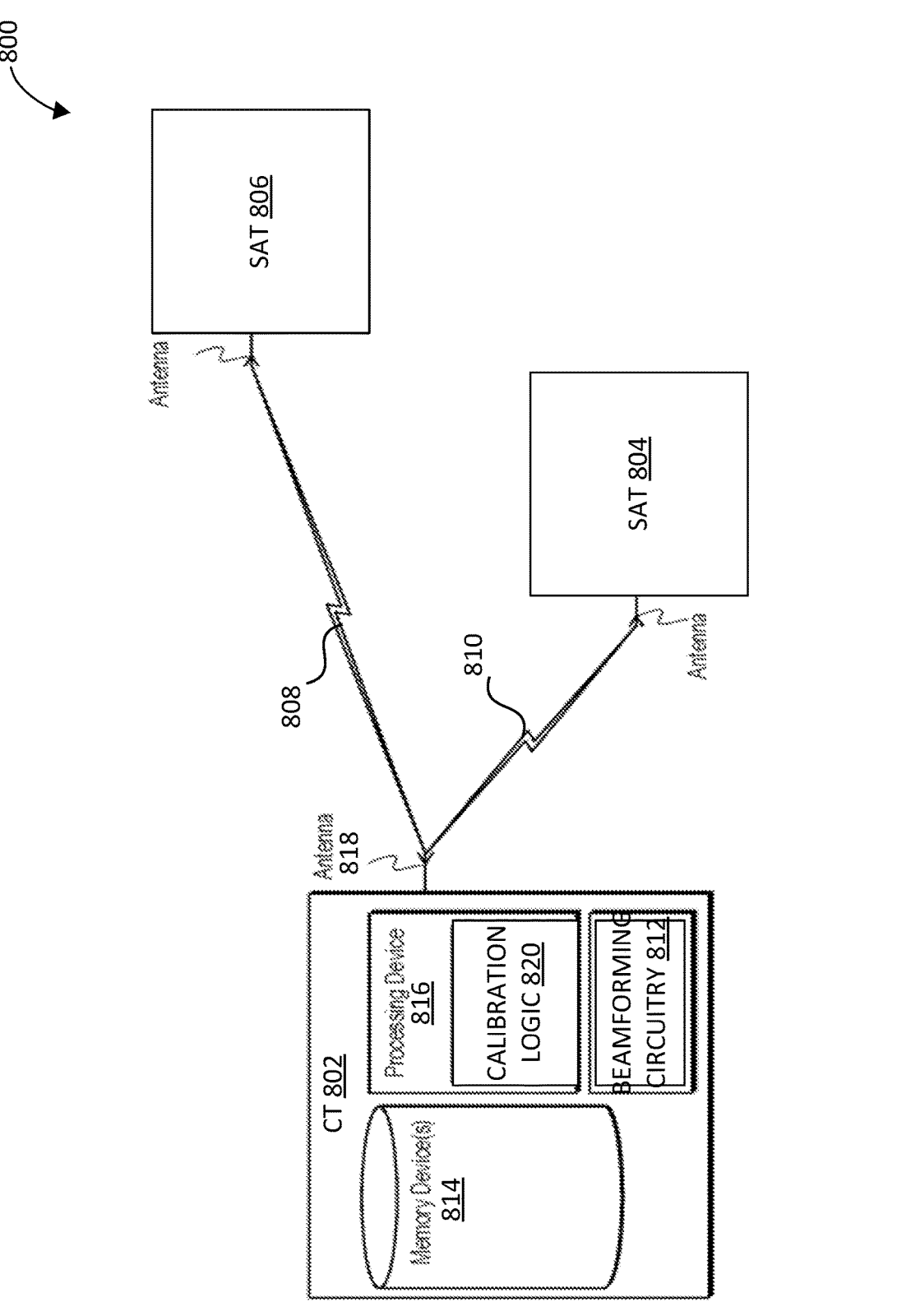
FIG. 8 is a block diagram of a satellite network including a CT with a phased array antenna with in-field calibration antennas outage according to at least one embodiment.

FIG. 8 is a block diagram of a satellite network 800 including a CT 802 with a phased array antenna 818 with in-field calibration antennas according to at least one embodiment. The satellite network 800 can include multiple communication devices, including communication devices in CTs, SATs, etc. The CT 802 can be the UT 908 described below with respect to FIG. 9. The SAT 804 can be any one of the SAT 902a, 902b, . . . , etc., of FIG. 9. The communication devices in the satellite network 800 can receive position, navigation, and timing (PNT) information from an SAT 806. The processing device 816 can establish a communication link 810 with the SAT 804 and a communication link 808 with SAT 806. The SAT 804 and SAT 806 can be artificial satellites and may include one or more satellite communication elements (e.g., discussed further in FIG. 9 to FIG. 12). The SAT 804 can be considered an anchor SAT that provides PNT information.

In at least one embodiment, the CT 802 includes a processing device 816 that implements a calibration logic 820, beamforming circuitry 812, and one or more memory device(s) 814. The processing device 816 can be or include one or more CPUs, microcontrollers, field programmable gate arrays, or other types of processors. The beamforming circuitry 812 can be coupled to one or more antennas, such as a phased array antenna 818 to communicate with other devices. The CT 802 can include other circuitry for communicating wirelessly. For example, the CT 802 can include one or more RF chains. The RF chains can have low-noise amplifiers (LNAs), automatic gain controllers (AGCs), analog-to-digital converters (ADCs), digital beamforming (DBF) devices, etc., to transmit signals and/or process received signals (e.g., directs analog and digital beamforming components, converts the signal to a digital representation, and processing the digital information) to produce digital samples of the received signal. In some embodiments, instead of two or more antennas, a single antenna with multiple apertures may be used. The RF chain(s) can be configured to directly receive beams to receive signals at various beamforming angles. Receive beams may be directed using a weighting pattern across beamforming elements and an antenna array. The weighting pattern may result in a sensitivity pattern due to signal interference. An antenna gain pattern may include a weighting pattern (or distribution of signal processing weights) that may include a combination of beamforming values, such as phase shifting values, signal amplifier values, etc., that are configured to steer a signal (e.g., main lobe, side lobes, signal minimum points, etc.) to orient at different directions. An antenna gain pattern may include a main lobe, side lobes, and signal minimums spread across various directions relative to a bearing angle of an antenna array. In some embodiment, a bearing angle is defined as a direction normal to a plane of an antenna array (or, more generally, a portion and an array antenna). Further details regarding beamforming and beam steering are discussed in FIG. 12.

In at least one embodiment, the calibration logic 820 can include processing logic comprising hardware, software, firmware, or any combination thereof. The calibration logic 820 can calibrate the phased array antenna 818 in a calibration mode. In this mode, the calibration logic 820 can couple a transmitter or a receiver to the metal element to operate as an in-field calibration antenna in the calibration mode. The metal element can operate as a parasitic element in a non-calibration mode (e.g., normal mode). The parasitic element can break a periodicity of the phased array antenna 818.

Although devices of the satellite network 800 are illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, application-specific integrated circuits (ASICs), radio-frequency integrated circuits (RFICs), and combinations of various hardware and logic circuitry for performing at least the functions described herein. In some embodiments, the functional elements of a device may refer to one or more processes operating on one or more processing elements.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

FIG. 9 illustrates a portion of a communication system 900 that includes two satellites of a constellation of satellites 902a, 902b, . . . , etc., each satellite 902 being in orbit 904 according to embodiments of the present disclosure. The system 900 shown here comprises a plurality (or "constellation") of satellites 902a, 902b, . . . , etc., each satellite 902 being in orbit 904 as part of a satellite network, such as satellite network 800 of FIG. 8. Also shown is a ground station 906, a user terminal (UT) 908 (also referred to herein as customer terminal (CT)), and a user device 910.

The constellation may comprise hundreds or thousands of satellites 902, in various orbits 904. For example, one or more of these satellites 902 may be in non-geosynchronous orbits (NGOs) in which they are in constant motion with respect to the Earth. For example, the orbit 904 is a low earth orbit (LEO). In this illustration, orbit 904 is depicted with an arc pointed to the right. A first satellite (SAT1) 902a is leading (ahead of) a second satellite (SAT2) 902b in the orbit 904.

The satellite 902 may comprise a structural system 912, a control system 918, a power system 924, a maneuvering system 930, and a communication system 936. In other implementations, some systems may be omitted, or other systems added. One or more of these systems may be communicatively coupled with one another in various combinations.

The structural system 912 comprises one or more structural elements to support the operation of the satellite 902. For example, the structural system 912 may include trusses, struts, panels, and so forth. The components of other systems may be affixed to or housed by the structural system 912. For example, the structural system 912 may provide mechanical mounting and support for solar panels in the power system 924. The structural system 912 may also provide for thermal control to maintain components of the satellite 902 within operational temperature ranges. For example, the structural system 912 may include louvers, heat sinks, radiators, and so forth.

The control system 918 provides various services, such as operating the onboard systems, resource management, providing telemetry, processing commands, and so forth. For example, the control system 918 may direct the operation of the communication system 936.

The power system 924 provides electrical power to operate the components onboard the satellite 902. The power system 924 may include components to generate electrical energy. For example, the power system 924 may comprise one or more photovoltaic cells, thermoelectric devices, fuel cells, and so forth. The power system 924 may include components to store electrical energy. For example, the power system 924 may comprise one or more batteries, fuel cells, and so forth.

The maneuvering system 930 maintains the satellite 902 in one or more specified orientations or orbit 904. For example, the maneuvering system 930 may stabilize the satellite 902 with respect to one or more axis. In another example, the maneuvering system 930 may move the satellite 902 to a specified orbit 904. The maneuvering system 930 may include one or more computing devices, sensors, thrusters, momentum wheels, solar sails, drag devices, and so forth. For example, the sensors of the maneuvering system 930 may include one or more global navigation satellite system (GNSS) receivers, such as global positioning system (GPS) receivers, to provide information about the position and orientation of the satellite 902 relative to Earth. In another example, the sensors of the maneuvering system 930 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 936 provides communication with one or more other devices, such as other satellites 902, ground stations 906, user terminals 908, and so forth. The communication system 936 may include one or more modems, digital signal processors, power amplifiers, antennas (including at least one antenna that implements multiple antenna elements, such as a phased array antenna and an embedded calibration antenna), processors, memories, storage devices, communications peripherals, interface buses, and so forth. Such components support communications with other satellites 902, ground stations 906, user terminals 908, and so forth, using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 936 may be output to other systems, such as the control system 918, for further processing. Output from a system, such as the control system 918, may be provided to the communication system 936 for transmission.

One or more ground stations 906 are in communication with one or more satellites 902. The ground stations 906 may pass data between the satellites 902, a management system 914, networks such as the Internet, and so forth. The ground stations 906 may be emplaced on land, on vehicles, at sea, and so forth. Each ground station 906 may comprise a communication system 916. Each ground station 906 may use the communication system 916 to establish communication with one or more satellites 902, other ground stations 906, and so forth. The ground station 906 may also be connected to one or more communication networks. For example, the ground station 906 may connect to a terrestrial fiber optic communication network. The ground station 906 may act as a network gateway, passing user data 934 or other data between the one or more communication networks and the satellites 902. Such data may be processed by the ground station 906 and communicated via the communication system 916. The communication system 916 of a ground station may include components similar to those of the communication system 936 of a satellite 902 and may perform similar communication functionalities. For example, the communication system 916 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 906 are in communication with a management system 914. The management system 914 is also in communication, via the ground stations 906, with the satellites 902 and the UTs 908. The management system 914 coordinates the operation of the satellites 902, ground stations 906, UTs 908, and other resources of the communication system 900. The management system 914 may comprise one or more of an orbital mechanics system 922 or a scheduling system 928. In some embodiments, the scheduling system 928 can operate in conjunction with an HD controller.

The orbital mechanics system 922 determines orbital data 926 that is indicative of a state of a particular satellite 902 at a specified time. In one implementation, the orbital mechanics system 922 may use orbital elements that represent characteristics of the orbit 904 of the satellites 902 in the constellation to determine the orbital data 926 that predicts location, velocity, and so forth of particular satellites 902 at particular times or time intervals. For example, the orbital mechanics system 922 may use data obtained from actual observations from tracking stations, data from the satellites 902, scheduled maneuvers, and so forth to determine the orbital elements. The orbital mechanics system 922 may also consider other data, such as space weather, collision mitigation, orbital elements of known debris, and so forth.

The scheduling system 928 schedules resources to provide communication to the UTs 908. For example, the scheduling system 928 may determine handover data that indicates when communication is to be transferred from the first satellite 902*a* to the second satellite 902*b*. Continuing the example, the scheduling system 928 may also specify communication parameters such as frequency, timeslot, and so forth. During operation, the scheduling system 928 may use information such as the orbital data 926, system status data 932, user terminal data 920, and so forth.

The system status data 932 may comprise information such as which UTs 908 are currently transferring data, satellite availability, current satellites 902 in use by respective UTs 908, capacity available at particular ground stations 906, and so forth. For example, the satellite availability may comprise information indicative of satellites 902 that are available to provide communication service or those satellites 902 that are unavailable for communication service. Continuing the example, a satellite 902 may be unavailable due to malfunction, previous tasking, maneuvering, and so forth. The system status data 932 may be indicative of past status, predictions of future status, and so forth. For example, the system status data 932 may include information such as projected data traffic for a specified interval of time based on previous transfers of user data 934. In another example, the system status data 932 may be indicative of future statuses, such as a satellite 902 being unavailable to provide communication service due to scheduled maneuvering, scheduled maintenance, scheduled decommissioning, and so forth.

The user terminal data 920 may comprise information such as a location of a particular UT 908. The user terminal data 920 may also include other information such as a priority assigned to user data 934 associated with that UT 908, information about the communication capabilities of that particular UT 908, and so forth. For example, a particular UT 908 in use by a business may be assigned a higher priority relative to a UT 908 operated in a residential setting. Over time, different versions of UTs 908 may be deployed, having different communication capabilities such as being able to operate at particular frequencies, supporting different signal encoding schemes, having different antenna configurations, and so forth.

The UT 908 includes a communication system 938 to establish communication with one or more satellites 902. The communication system 938 of the UT 908 may include components similar to those of the communication system 936 of a satellite 902 and may perform similar communication functionalities. For example, the communication system 938 may include one or more modems, digital signal processors, power amplifiers, antennas (including at least one antenna that implements multiple antenna elements, such as a phased array antenna), processors, memories, storage devices, communications peripherals, interface buses, and so forth. The UT 908 passes user data 934 between the constellation of satellites 902 and the user device 910. The user data 934 includes data originated by the user device 910 or addressed to the user device 910. The UT 908 may be fixed or in motion. For example, the UT 908 may be used at a residence or on a vehicle such as a car, boat, aerostat, drone, airplane, and so forth.

The UT 908 includes a tracking system 940. The tracking system 940 uses almanac data 942 to determine tracking data 944. The almanac data 942 provides information indicative of orbital elements of the orbit 904 of one or more satellites 902. For example, the almanac data 942 may comprise orbital elements such as "two-line element" data for the satellites 902 in the constellation that are broadcast or otherwise sent to the UTs 908 using the communication system 938.

The tracking system 940 may use the current location of the UT 908 and the almanac data 942 to determine the tracking data 944 for the satellite 902. For example, based on the current location of the UT 908 and the predicted position and movement of the satellites 902, the tracking system 940 can calculate the tracking data 944. The tracking data 944 may include information indicative of azimuth, elevation, distance to the second satellite, time of flight correction, or other information at a specified time. The determination of the tracking data 944 may be ongoing. For example, the first UT 908 may determine tracking data 944 every 1000 ms, every second, every five seconds, or at other intervals.

With regard to FIG. 9, an uplink is a communication link that allows data to be sent to a satellite 902 from a ground station 906, UT 908, or a device other than another satellite 902. Uplinks are designated as UL1, UL2, UL3, and so forth. For example, UL1 is a first uplink from the ground station 906 to the second satellite 902*b*. In comparison, a downlink is a communication link that allows data to be sent from the satellite 902 to a ground station 906, UT 908, or device other than another satellite 902. For example, DL1 is a first downlink from the second satellite 902*b* to the ground station 906. The satellites 902 may also be in communication with one another. For example, a crosslink 946 provides for communication between satellites 902 in the constellation.

The satellite 902, the ground station 906, the user terminal 908, the user device 910, the management system 914, or other systems described herein may include one or more computer devices or computer systems comprising one or more hardware processors, computer-readable storage media, and so forth. For example, the hardware processors may include application-specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components.

In one embodiment, the system memory stores instructions of methods to control the operation of the electronic device. The electronic device performs functions by using the processor(s) to execute instructions provided by the system memory. Embodiments may be provided as a software program or computer program, including a non-transitory computer-readable storage medium having stored thereon instructions (in compressed or uncompressed form) that may be used to program a computer (or other electronic devices) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product, including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise the transmission of software by the Internet.

Figure 10:
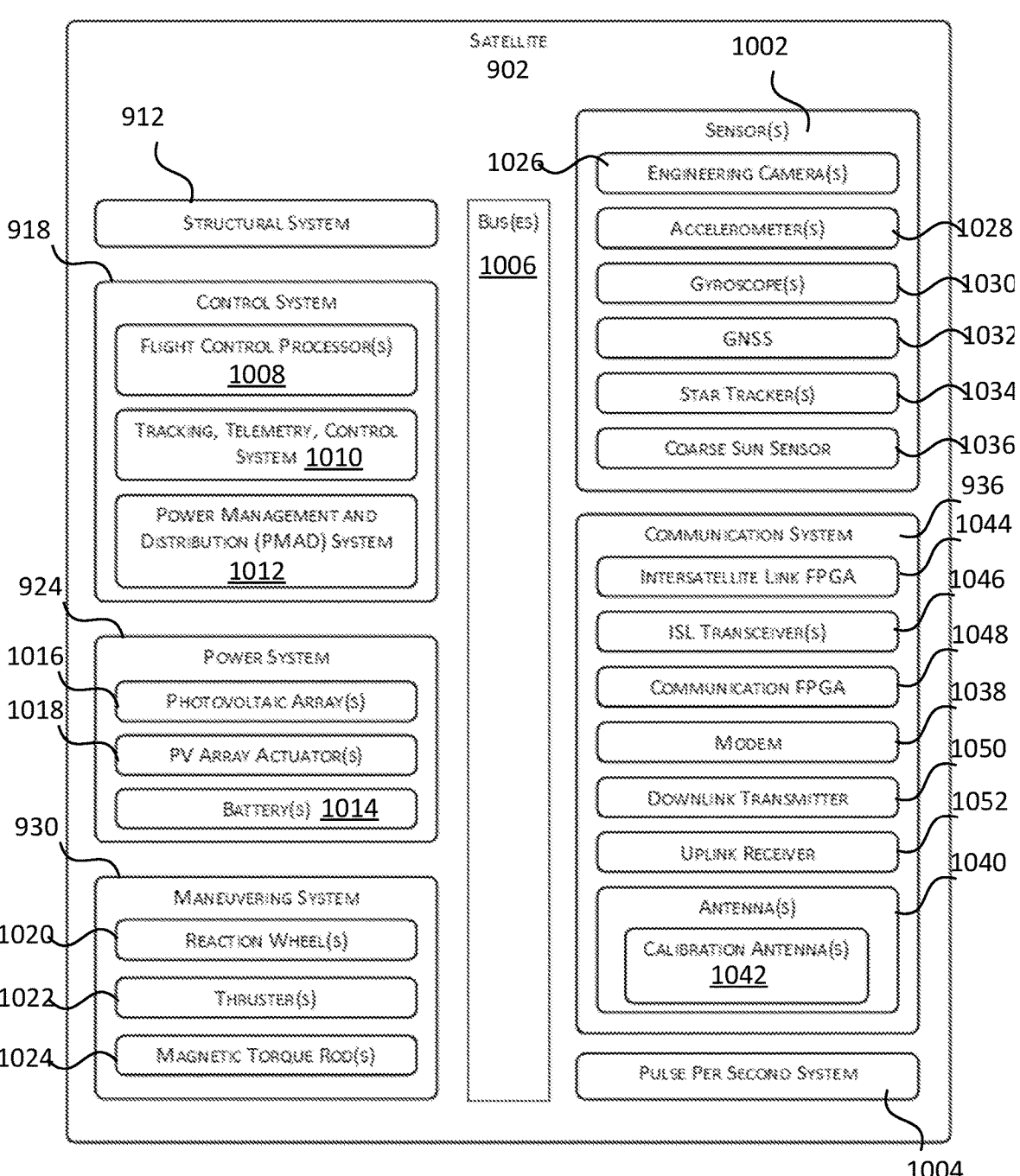
FIG. 10 is a functional block diagram of some systems associated with the satellite, according to some implementations.

FIG. 10 is a functional block diagram of some systems associated with the satellite 902, according to some implementations. The satellite 902 may comprise a structural system 912, a control system 918, a power system 924, a maneuvering system 930, one or more sensor(s) 1002, and a communication system 936. A pulse per second (PPS) system 1004 may be used to provide a timing reference to the systems onboard the satellite 902. One or more bus(es) 1006 may be used to transfer data between the systems onboard the satellite 902. In some implementations, redundant busses may be provided. The bus(es) 1006 may include, but are not limited to, data busses such as Controller Area Network Flexible Data Rate (CAN FD), Ethernet, Serial Peripheral Interface (SPI), and so forth. In some implementations, the bus(es) 1006 may carry other signals. For example, a radio frequency bus may comprise a coaxial cable, waveguides, and so forth to transfer radio signals from one part of the satellite 902 to another. In other implementations, some systems may be omitted, or other systems added. One or more of these systems may be communicatively coupled with one another in various combinations.

The structural system 912 comprises one or more structural elements to support the operation of the satellite 902. For example, the structural system 912 may include trusses, struts, panels, and so forth. The components of other systems may be affixed to or housed by the structural system 912. For example, the structural system 912 may provide mechanical mounting and support for solar panels in the power system 924. The structural system 912 may also provide for thermal control to maintain components of the satellite 902 within operational temperature ranges. For example, the structural system 902 may include louvers, heat sinks, radiators, and so forth.

The control system 918 provides various services, such as operating the onboard systems, resource management, providing telemetry, processing commands, and so forth. For example, the control system 918 may direct the operation of the communication system 936. The control system 918 may include one or more flight control processors 1008. The flight control processors 1008 may comprise one or more processors, FPGAs, and so forth. A tracking, telemetry, and control (TTC) system 1010 may include one or more processors, radios, and so forth. For example, the TTC system 1010 may comprise a dedicated radio transmitter and receiver to receive commands from a ground station 906, send telemetry to the ground station 906, and so forth. A power management and distribution (PMAD) system 1012 may direct the operation of the power system 924, control distribution of power to the systems of the satellite 902, control battery 1014 charging, and so forth.

The power system 924 provides electrical power to operate the components onboard the satellite 902. The power system 924 may include components to generate electrical energy. For example, the power system 924 may comprise one or more photovoltaic arrays 1016 comprising a plurality of photovoltaic cells, thermoelectric devices, fuel cells, and so forth. One or more PV array actuators 1018 may be used to change the orientation of the photovoltaic array(s) 1016 relative to the satellite 902. For example, the PV array actuator 1018 may comprise a motor. The power system 924 may include components to store electrical energy. For example, the power system 924 may comprise one or more batteries 1014, fuel cells, and so forth.

The maneuvering system 930 maintains the satellite 902 in one or more specified orientations or orbit 904. For example, the maneuvering system 930 may stabilize the satellite 902 with respect to one or more axes. In another example, the maneuvering system 930 may move the satellite 902 to a specified orbit 904. The maneuvering system 930 may include one or more of reaction wheel(s) 1020, thrusters 1022, magnetic torque rods 1024, solar sails, drag devices, and so forth. The thrusters 1022 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellent, using electrical power obtained from the power system 916 to expel the water and produce thrust. During operation, the maneuvering system 930 may use data obtained from one or more of the sensor(s) 1002.

The satellite 902 includes one or more sensor(s) 1002. The sensor(s) 1002 may include one or more engineering camera(s) 1026. For example, an engineering camera 1026 may be mounted on the satellite 902 to provide images of at least a portion of the photovoltaic PV array 1016. Accelerometer(s) 1028 provide information about the acceleration of the satellite 902 along one or more axes. Gyroscope(s) 1030 provide information about the rotation of the satellite 902 with respect to one or more axes. The sensor(s) 1002 may include a global navigation satellite system (GNSS) receiver 1032, such as a Global Positioning System (GPS) receiver, to provide information about the position of the satellite 902 relative to Earth. In some implementations, the GNSS 1032 may also provide information indicative of velocity, orientation, and so forth. One or more star tracker(s) 1034 may be used to determine an orientation of the satellite 902. A coarse sun sensor 1036 may be used to detect the sun, provide information on the relative position of the sun with respect to the satellite 902, and so forth. The satellite 902 may include other sensor(s) 1002 as well. For example, the satellite 902 may include a horizon detector, radar, lidar, and so forth.

The communication system 936 provides communication with one or more other devices, such as other satellites 902, ground stations 906, user terminals 908, and so forth. The communication system 936 may include one or more modems 1038, digital signal processors, power amplifiers, antennas antenna 1040 (including a calibration antenna 1042), such as a phased array antenna), processors, memories, storage devices, communications peripherals, interface buses, and so forth. Such components support communications with other satellites 902, ground stations 906, user terminals 908, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 936 may be output to other systems, such as the control system 918, for further processing. Output from a system, such as the control system 918, may be provided to the communication system 936 for transmission.

The communication system 936 may include hardware to support the crosslink 946 (e.g., intersatellite link). For example, an intersatellite link FPGA 1044 may be used to modulate data sent and received by one or more ISL transceiver(s) 1046 to send data between satellites 902. The ISL transceiver(s) 1046 may operate using radio frequencies, optical frequencies, and so forth.

A communication FPGA 1048 may be used to facilitate communication between the satellite 902 and the ground stations 906, UTs 908, and so forth. For example, the communication FPGA 1048 may direct the operation of a modem 1038 to modulate signals sent using a downlink transmitter 1050 and demodulate signals received using an uplink receiver 1052. The satellite 902 may include one or more antennas antenna 1040. For example, one or more parabolic antennas may be used to provide communication between the satellite 902 and one or more ground stations 906. In another example, a phased array antenna may be used to provide communication between the satellite 902 and the UTs 908.

Figure 11:
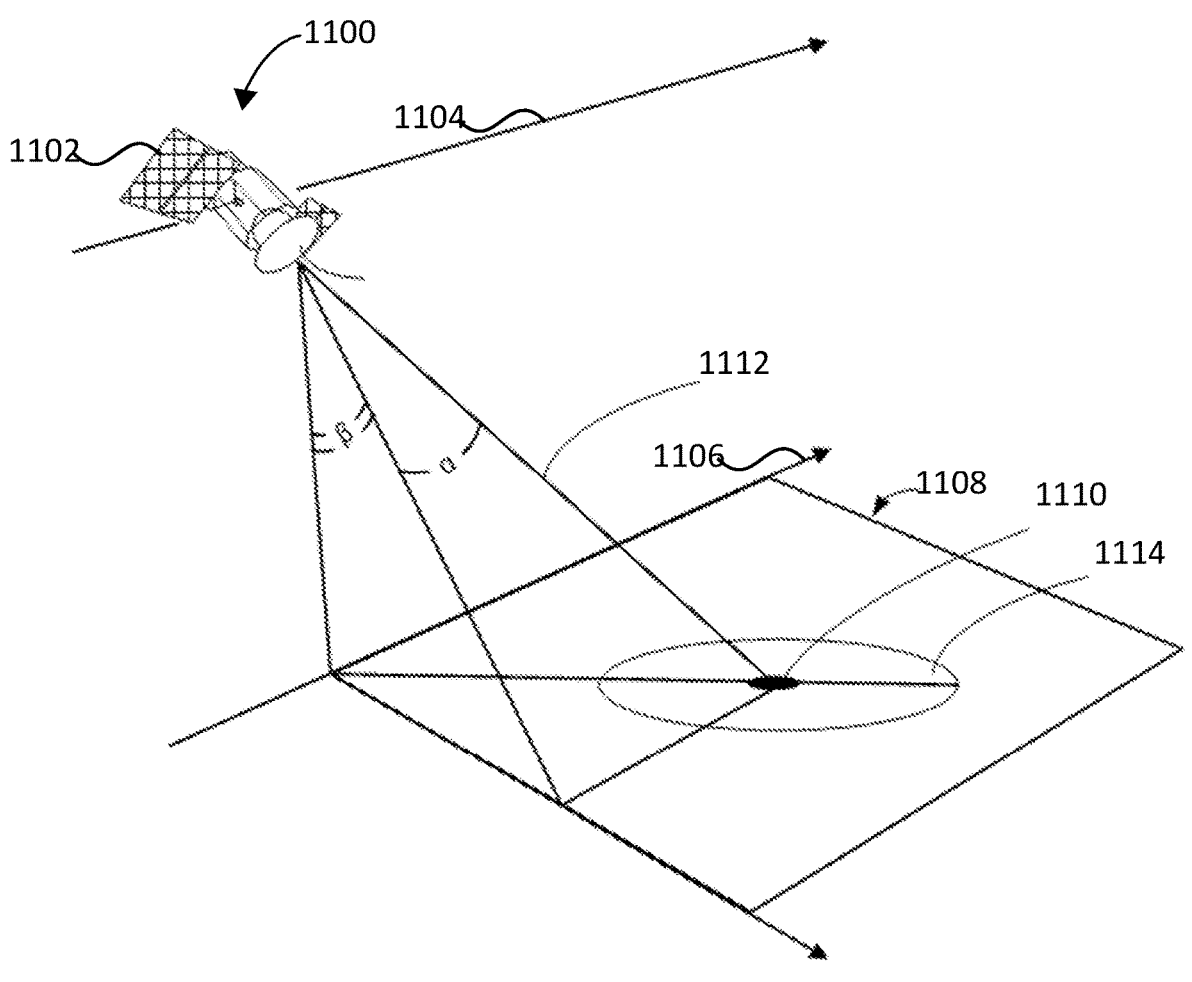
FIG. 11 illustrates a satellite including an antenna system that is steerable, according to embodiments of the present disclosure.

FIG. 11 illustrates the satellite 1100 including an antenna system 1102 that is steerable according to embodiments of the present disclosure. The satellite 1100 can be the SAT 804 of the satellite network 800 of FIG. 8. The antenna system 1102 may include multiple antenna elements that form an antenna and that can be mechanically or electrically steered individually, collectively, or a combination thereof. In an example, the antenna is a phased array antenna.

In orbit 904, the satellite 1100 follows a path 1104, the projection of which onto the surface of the Earth forms a ground path 1106. In the example illustrated in FIG. 11, the ground path 1106 and a projected axis extending orthogonally from the ground path 1106 at the position of the satellite 1100, together define a region 1108 of the surface of the Earth. In this example, the satellite 1100 can establish uplink and downlink communications with one or more of ground stations, user terminals, or other devices within the region 1108. In some embodiments, the region 1108 may be located in a different relative position to the ground path 1106 and the position of the satellite 1100. For example, the region 1108 may describe a region of the surface of the Earth directly below the satellite 1100. Furthermore, embodiments may include communications between the satellite 1100, an airborne communications system, and so forth.

As shown in FIG. 11, a communication target 1110 (e.g., a ground station, a user terminal, or a CT (such as an HD CT)) is located within the region 1108. The satellite 1100 controls the antenna system 1102 to steer transmission and reception of communications signals to selectively communicate with the communication target 1110. For example, in a downlink transmission from the satellite 1100 to the communication target 1110, a signal beam 1112 emitted by the antenna system 1102 is steerable within an area 1114 of the region 1108. In some implementations, the signal beam 1112 may include multiple subbeams. The extents of the area 1114 define an angular range within which the signal beam 1112 is steerable, where the direction of the signal beam 1112 is described by a beam angle "α" relative to a surface normal vector of the antenna system 1102. In two-dimensional phased array antennas, the signal beam 1112 is steerable in two dimensions, described in 15 by a second angle "β" orthogonal to the beam angle α. In this way, the area 1114 is a two-dimensional area within the region 1108, rather than a linear track at a fixed angle determined by the orientation of the antenna system 1102 relative to the ground path 1106.

In FIG. 11, as the satellite 1100 follows the path 1104, the area 1114 tracks along the surface of the Earth. In this way, the communication target 1110, which is shown centered in the area 1114 for clarity, is within the angular range of the antenna system 1102 for a period of time. During that time, signals communicated between the satellite 1100 and the communication target 1110 are subject to bandwidth constraints, including but not limited to signal strength and calibration of the signal beam 1112. In an example, for phased array antenna systems, the signal beam 1112 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 12:
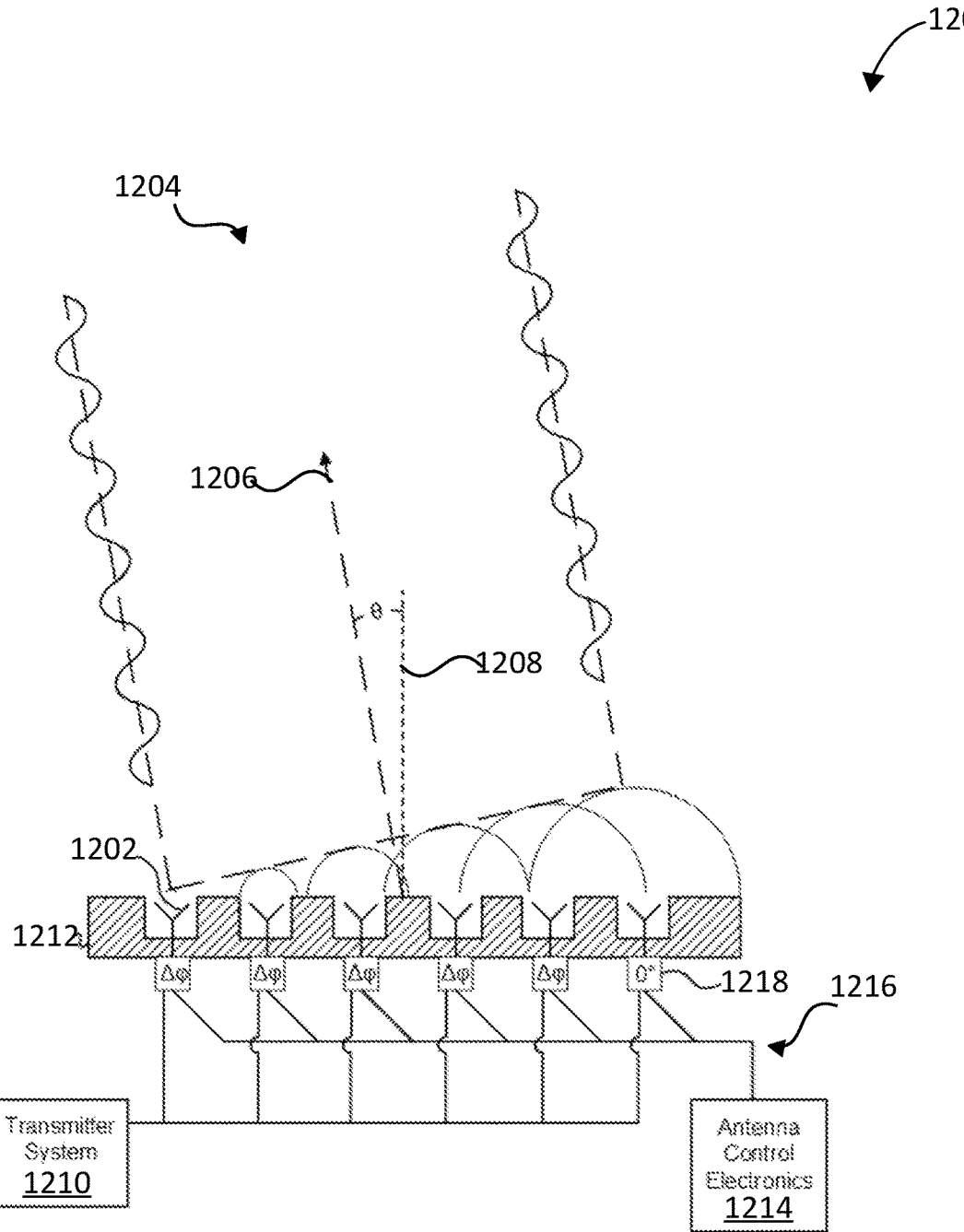
FIG. 12 illustrates a simplified schematic of an antenna, according to embodiments of the present disclosure.

FIG. 12 illustrates a simplified schematic of an antenna 1200, according to embodiments of the present disclosure. The antenna 1200 may be a component of the antenna system 1102 of FIG. 11. As illustrated, the antenna 1200 is a phased array antenna that includes multiple antenna elements 1202. Interference between the antenna elements 1202 forms a directional radiation pattern in both transmitter and receiver arrays, forming a beam 1204 (beam extents shown as dashed lines). The beam 1204 is a portion of a larger transmission pattern (not shown) that extends beyond the immediate vicinity of the antenna 1200. The beam 1204 is directed along a beam vector 1206, described by an angle "θ" relative to an axis 1208 normal to a surface of the antenna 1200. As described below, the beam 1204 is one or more of steerable or shapeable through control of operating parameters including, but not limited to, a phase and an amplitude of each antenna element 1202.

In FIG. 12, the antenna 1200 includes, within a transmitter section 1212, the antenna elements 1202, which may include, but are not limited to, omnidirectional transmitter antennas coupled to a transmitter system 1210, such as the downlink transmitter 1050 of FIG. 10. The transmitter system 1210 provides a signal, such as a downlink signal to be transmitted to a ground station on the surface. The downlink signal is provided to each antenna element 1202 as a time-varying signal that may include several multiplexed signals. To steer the beam 1204 relative to the axis 1208, the antenna 1200 (e.g., phased array antenna system) includes antenna control electronics 1214 controlling a radio frequency (RF) feeding network 1216, including multiple signal conditioning components 1218 interposed between the antenna elements 1202 and the transmitter system 1210. The signal conditioning components 1218 introduce one or more of a phase modulation or an amplitude modulation (e.g., by phase shifters), as denoted by "Δφ" in FIG. 12, to the signal sent to the antenna elements 1202. As shown in FIG. 12, introducing a progressive phase modulation produces interference in the individual transmission of each antenna element 1202 that generates the beam 1204.

The phase modulation imposed on each antenna element 1202 can differ and can be dependent on a spatial location of a communication target that determines an optimum beam vector (e.g., where the beam vector 1206 is found by one or more of maximizing signal intensity or connection strength). The optimum beam vector may change with time as the communication target 1110 moves relative to the antenna 1200 (e.g., phased array antenna system).

In the above description, numerous details are set forth. It will be apparent, however, to one of ordinary skill in the art having the benefit of this disclosure, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), and magnetic-optical disks, Random Access Memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A customer terminal (CT) comprising:
an array antenna comprising a repeating pattern of unit cells, wherein each unit cell comprises:
a first patch element located in a first layer of the array antenna, wherein the first patch element is coupled to a first feed point;
a second patch element located in the first layer, wherein the second patch element is coupled to a second feed point;
a third patch element located in the first layer, wherein the third patch element is coupled to a third feed point;
a metal element located in the first layer, wherein the metal element operates as a parasitic element in a first mode of the CT, the parasitic element to break a periodicity of the repeating pattern of unit cells in the first mode, wherein the metal element operates as a calibration antenna in a second mode of the CT, wherein the metal element is selectively coupled to a fourth feed point in the second mode;
beamforming circuitry coupled to the array antenna; and
a processing device coupled to the beamforming circuitry, wherein the processing device:
establishes, using the array antenna and the beamforming circuitry, a communication link with a satellite (SAT) in the first mode; and
calibrates, using the calibration antenna, the array antenna in the second mode.

2. The CT of claim 1, wherein a first metal element of a first unit cell of the repeating pattern of unit cells operates as a calibration antenna that transmits electromagnetic energy, wherein the calibration antenna further comprises a plurality of grounding points, wherein the plurality of grounding points are coupled to a ground potential in the second mode.

3. The CT of claim 1, wherein a first metal element of a first unit cell of the repeating pattern of unit cells operates as a calibration antenna that receives electromagnetic energy, wherein the calibration antenna further comprises one or more tuning elements located in one or more layers of the array antenna below the first metal element, wherein the one or more tuning elements are coupled to the fourth feed point.

4. The CT of claim 3, wherein the one or more tuning elements comprise:
a first tuning element located in a second layer of the array antenna below the first layer, wherein the first tuning element has a disk shape with a diameter that is less than a width of the metal element; and
a second tuning element located in a third layer of the array antenna below the first layer, wherein the second tuning element has a rectangular shape with a length that is less than the diameter of the first tuning element.

5. A customer terminal (CT) comprising:
an array antenna comprising a repeating pattern of elements comprising:
one or more transmit (TX) or receive (RX) elements located in a first layer of the array antenna; and
a metal element located in the first layer, wherein the metal element operates as a parasitic element to break a periodicity of the array antenna in a first mode of the CT, and wherein the metal element operates as a calibration antenna in a second mode of the CT.

6. The CT of claim 5, wherein the one or more TX or RX elements comprises:

a first patch element located in the first layer, wherein the first patch element is coupled to a first feed point of a first transmitter;

a second patch element located in the first layer, wherein the second patch element is coupled to a second feed point of a second transmitter; and a third patch element located in the first layer, wherein the third patch element is coupled to a third feed point of a first receiver, and wherein the metal element, in the second mode, is selectively coupled to a fourth feed point of a third transmitter or a second receiver.

7. The CT of claim 6, wherein the metal element comprises a same shape as the third patch element.

8. The CT of claim 6, wherein the first patch element, the second patch element, and the third patch element are part of unit cell that forms the array antenna.

9. The CT of claim 5, further comprising a transmitter, wherein the calibration antenna is a TX antenna, wherein the TX antenna comprises a plurality of grounding points on the metal element, wherein the metal element is coupled to the transmitter and the plurality of grounding points are coupled to a ground potential in the second mode.

10. The CT of claim 9, wherein the TX antenna has a percentage bandwidth of approximately 5% with at least 4 dB return loss.

11. The CT of claim 5, further comprising a receiver, wherein the calibration antenna is an RX antenna, wherein the RX antenna comprises one or more elements located in one or more layers of the array antenna below the metal element, wherein the metal element and the one or more elements are coupled to the receiver in the second mode.

12. The CT of claim 11, wherein the RX antenna has a percentage bandwidth of approximately 16% with at least 4 dB return loss.

13. The CT of claim 11, wherein the one or more elements comprise:

a first tuning element located in a second layer of the array antenna below the first layer, wherein the first tuning element has a disk shape with a diameter that is less than a width of the metal element; and a second tuning element located in a third layer of the array antenna below the first layer, wherein the second tuning element has a rectangular shape with a length that is less than the diameter of the first tuning element.

14. The CT of claim 11, wherein the RX antenna further comprises:

a first ring located in the first layer, wherein the first ring surrounds the metal element;

a second ring located in a second layer of the array antenna below the first layer; and a third ring located in a third layer of the array antenna below the second layer, wherein the second ring and the third ring are coupled to a plurality of grounding points, wherein the first ring and the second ring are coupled together at points in between the plurality of grounding points, wherein the one or more elements comprises a tuning element located in the second layer, and wherein the tuning element has a disk shape with a diameter that is less than a width of the metal element.

15. The CT of claim 5, further comprising:

beamforming circuitry coupled to the array antenna; and a processing device coupled to the beamforming circuitry, wherein the processing device:

establishes, using the array antenna and the beamforming circuitry, a communication link with a satellite (SAT) in the first mode; and calibrates, using the calibration antenna, the array antenna in the second mode.

16. A customer terminal (CT) comprising:

an array antenna comprising a repeating pattern of elements comprising:

one or more transmit (TX) or receive (RX) elements located in a first layer of the array antenna;

a metal element located in the first layer, wherein the metal element operates as a parasitic element to break a periodicity of the array antenna in a first mode, and wherein the metal element operates as a calibration antenna in a second mode; and a receiver coupled to the metal element in the second mode, wherein the calibration antenna comprises:

the metal element;

a first ring located in the first layer, wherein the first ring surrounds the metal element; and one or more elements located in one or more layers of the array antenna below the first layer.

17. The CT of claim 16, wherein the calibration antenna further comprises:

a second ring located in a second layer of the array antenna below the first layer; and a third ring located in a third layer of the array antenna below the second layer, wherein the second ring and the third ring are coupled to a plurality of grounding points, wherein the first ring and the second ring are coupled together at points in between the plurality of grounding points.

18. The CT of claim 16, wherein the one or more elements comprises a tuning element located in a second layer of the array antenna below the first layer, and wherein the tuning element has a disk shape with a diameter that is less than a width of the metal element.

19. The CT of claim 16, wherein the calibration antenna has a percentage bandwidth of approximately 16% with at least 4 dB return loss.

20. The CT of claim 16, further comprising:

beamforming circuitry coupled to the array antenna; and a processing device coupled to the beamforming circuitry, wherein the processing device:

establishes, using the array antenna and the beamforming circuitry, a communication link with a satellite (SAT) in the first mode; and calibrates, using the calibration antenna, the array antenna in the second mode.

* * * * *